(12) United States Patent
Rassier et al.

(10) Patent No.: US 9,075,235 B2
(45) Date of Patent: Jul. 7, 2015

(54) METHOD AND SYSTEM FOR OPTICAL MICROSCOPY

(71) Applicant: The Royal Institution for the Advancement of Learning / McGill University, Motreal (CA)

(72) Inventors: Dilson Rassier, Montreal (CA); Albert Kalganov, Montreal (CA); Aleksander Labuda, Montreal (CA)

(73) Assignee: THE ROYAL INSTITUTION FOR THE ADVANCEMENT OF LEARNING / MCGILL UNIVERSITY, Montreal (CA)

( * ) Notice: Subject to any disclaimer, the term of this patent is extended or adjusted under 35 U.S.C. 154(b) by 275 days.

(21) Appl. No.: 13/632,221

(22) Filed: Oct. 1, 2012

(65) Prior Publication Data

US 2014/0092469 A1 Apr. 3, 2014

(51) Int. Cl.
| | |
|---|---|
| G02B 21/06 | (2006.01) |
| G02B 21/10 | (2006.01) |
| G02B 21/16 | (2006.01) |
| G02B 21/00 | (2006.01) |

(52) U.S. Cl.
CPC ............ *G02B 21/10* (2013.01); *G02B 21/0088* (2013.01); *G02B 21/16* (2013.01)

(58) Field of Classification Search
USPC ......................................................... 359/387
See application file for complete search history.

(56) References Cited

U.S. PATENT DOCUMENTS

| | | | | |
|---|---|---|---|---|
| 4,896,966 | A * | 1/1990 | Boisseau et al. | 382/128 |
| 6,454,437 | B1 * | 9/2002 | Kelly | 362/246 |
| 6,751,018 | B2 * | 6/2004 | Kawano et al. | 359/387 |
| 7,486,440 | B2 * | 2/2009 | Yoshida et al. | 359/387 |
| 7,808,699 | B2 * | 10/2010 | Ulrich et al. | 359/385 |
| 8,541,760 | B2 * | 9/2013 | Gonschor | 250/459.1 |
| 2008/0266659 | A1 * | 10/2008 | Ulrich et al. | 359/387 |
| 2011/0194176 | A1 * | 8/2011 | Behrend et al. | 359/387 |
| 2013/0077159 | A1 * | 3/2013 | Tani | 359/387 |

\* cited by examiner

*Primary Examiner* — Frank Font

(74) *Attorney, Agent, or Firm* — The Law Office of Michael E. Kondoudis

(57) ABSTRACT

Optical microscopy of biological specimens, particularly live cells, is difficult as they generally lack sufficient contrast to be studied successfully as typically the internal structures of the cell are colorless and transparent. Commonly, contrast is increased by staining the different structures with selective dyes, but this involves killing and fixing the sample. Staining may also introduce artifacts, apparent structural details caused by the processing of the specimen and are thus not a legitimate feature of the specimen. Further, microscopy of different elements of these biological specimens typically requires multiple microscopy techniques on multiple specimens. According to embodiments of the invention simultaneous imaging techniques are applied to a biological specimen such as fluorescent imaging and dark field imaging by designing an experimental evaluation system and associated illumination system addressing the conflicting demands of these approaches.

9 Claims, 16 Drawing Sheets

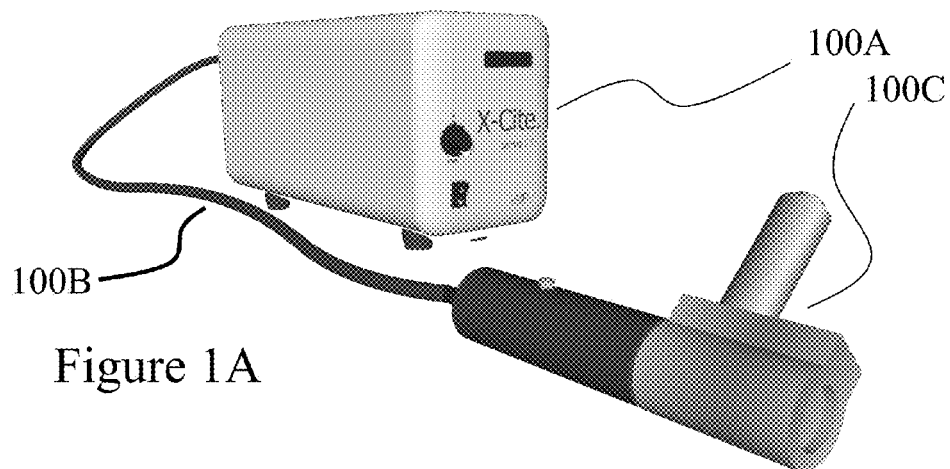
Figure 1A
Figure 1B
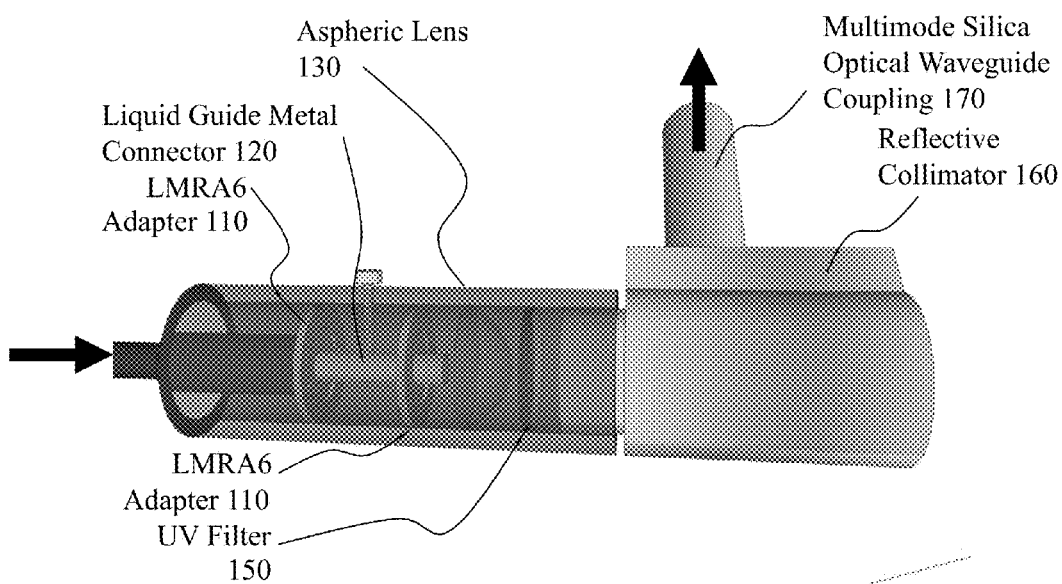
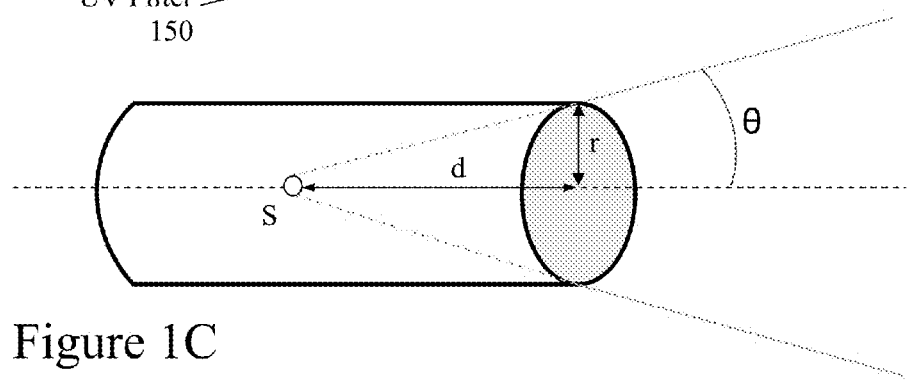
Figure 1C

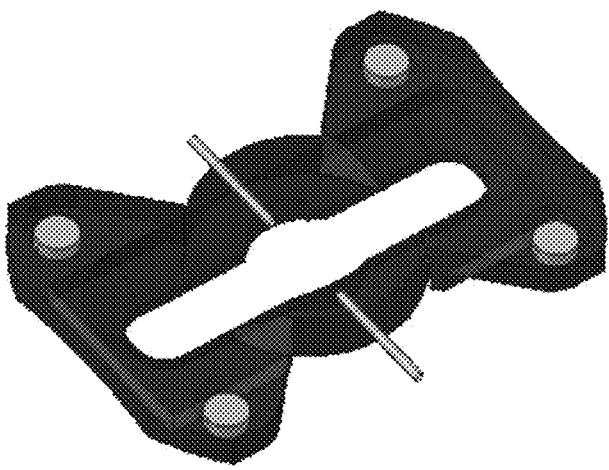
Figure 2D
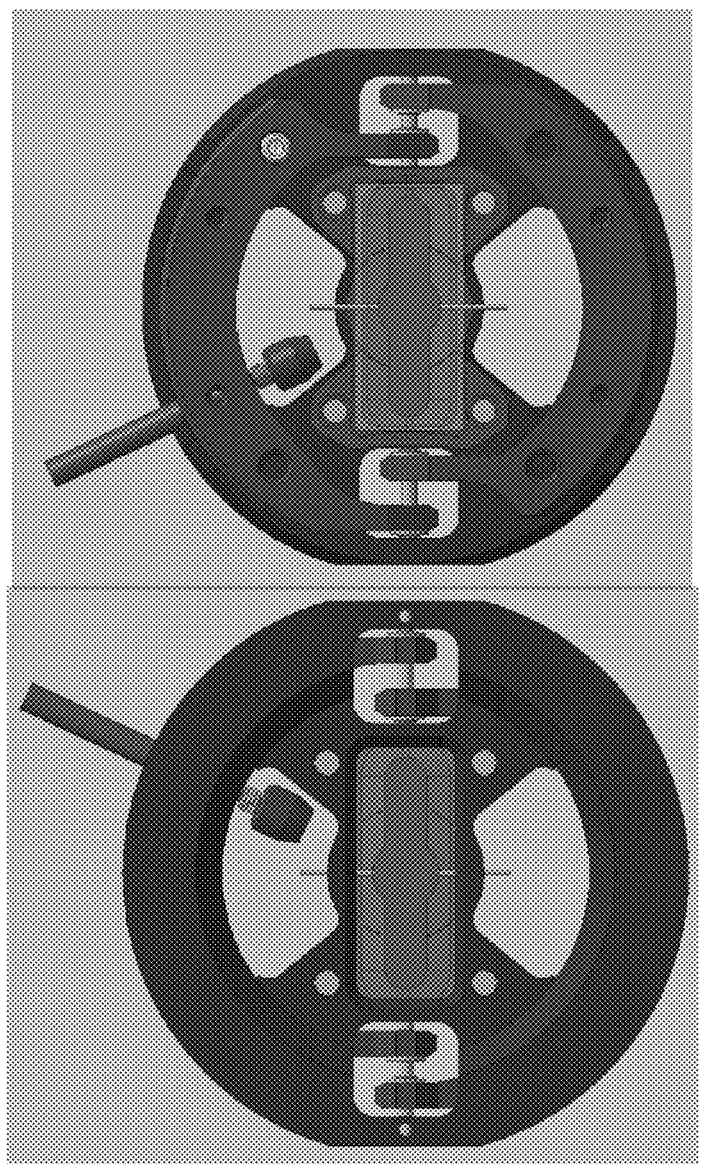
Figure 2E
Figure 2F

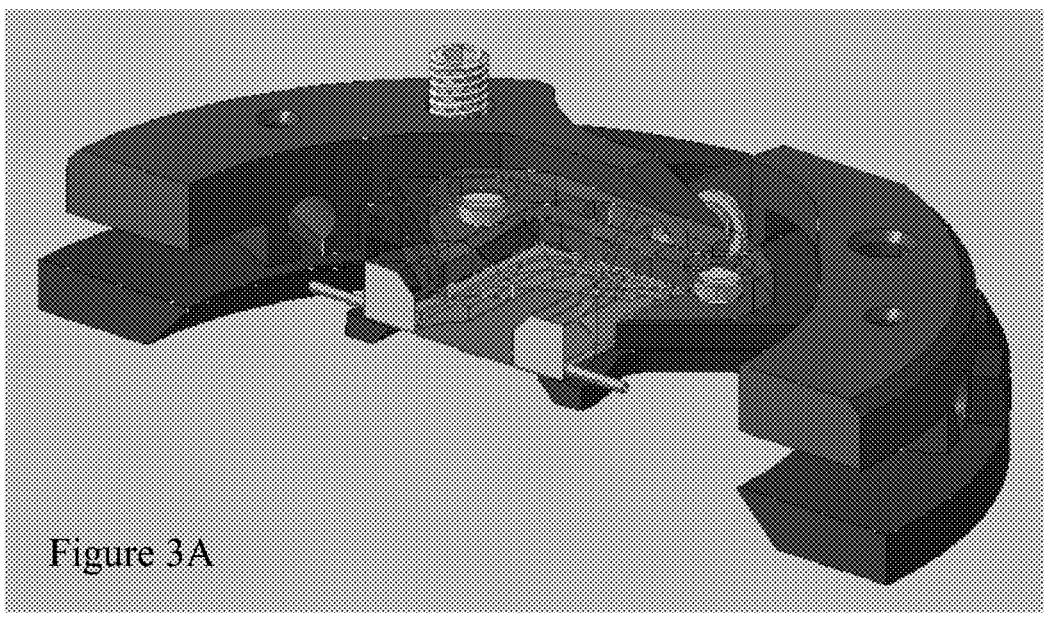
Figure 3A
Figure 3B
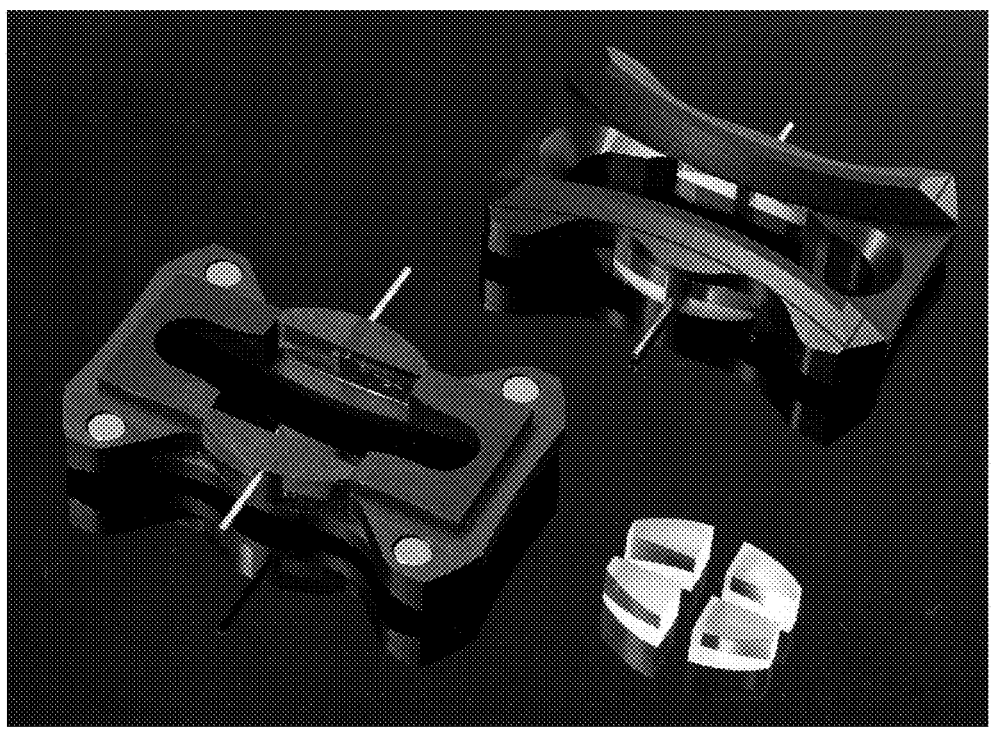

Figure 5A
Figure 5B
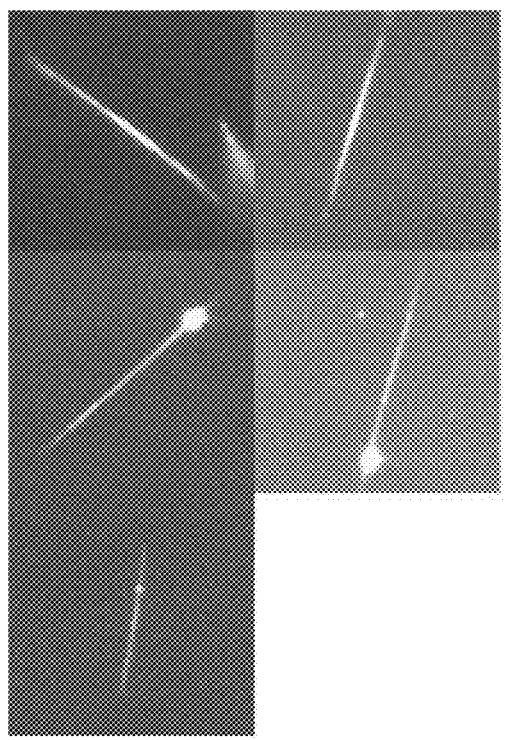
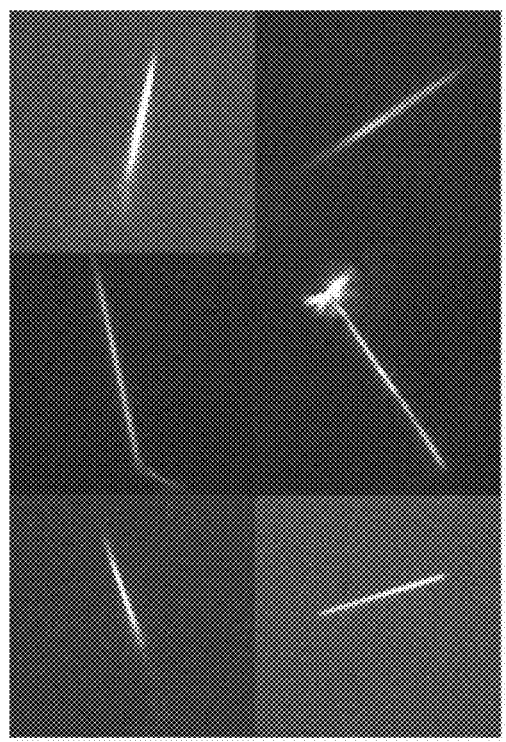
Figure 14A
Figure 14B
Figure 14C
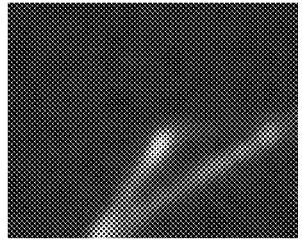 - 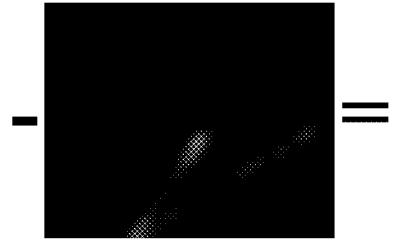 = 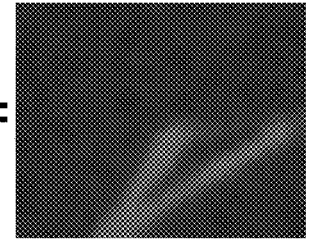

▬ Scale Bar = 1000nm

Scale Bar = 1000nm

Scale Bar = 1000nm

Scale Bar = 1000nm 

Scale Bar = 1000nm 

Scale Bar = 1000nm

METHOD AND SYSTEM FOR OPTICAL MICROSCOPY

FIELD OF THE INVENTION

The present invention relates to optical microscopy and more particularly to providing adjustable acceptance angle dark filed illumination in conjunction with simultaneous fluorescence imaging.

BACKGROUND OF THE INVENTION

Optical microscopy involves passing light transmitted through or reflected from the sample through a single or multiple lenses to allow a magnified view of the sample. The resulting image can be detected directly by the eye, imaged on a photographic plate or captured digitally. The typical system of lenses and imaging equipment, along with the appropriate illumination equipment, sample stage and support, make up the optical microscope. Typical standard optical microscopy, bright field microscopy, suffers from limitations which include that it can only image dark or strongly refracting objects effectively, diffraction limits resolution to approximately 0.2 µm in the visible region, and out of focus light from points outside the focal plane reduce image clarity.

Optical microscopy of biological specimens, particularly live cells, is difficult as they generally lack sufficient contrast to be studied successfully; typically the internal structures of the cell are colourless and transparent. Commonly, contrast is increased by staining the different structures with selective dyes, but this involves killing and fixing the sample. Staining may also introduce artifacts; apparent structural details caused by the processing of the specimen and are thus not a legitimate feature of the specimen.

Within the prior art these limitations have been overcome to some extent by specific microscopy techniques that can non-invasively increase the contrast of the image. In general, these techniques make use of differences in the refractive index of cell structures. These include:

- Oblique illumination—wherein side illumination gives the image a 3-dimensional appearance and can highlight otherwise invisible features;
- Dark field—wherein directly transmitted light entering the image plane is minimized thereby collecting only the light scattered by the sample;
- Dispersion staining—wherein an optical technique results in a colored image of a colorless object, where five different microscope configurations are used which include brightfield Becke line, oblique, darkfield, phase contrast and objective stop dispersion staining;
- Phase contrast—where differences in refractive index appear as differences in contrast within the image;
- Differential interference contrast—also known as Nomarski contrast microscopy wherein differences in optical density appear as differences in relief an exploits polarization differences near refractive index boundaries;
- Interference reflection microscopy—used to examine the adhesion of cells to a glass surface, using polarized light of a narrow range of wavelengths to be reflected whenever there is an interface between two substances with different refractive indices;
- Fluorescence—wherein certain compounds when illuminated with high energy light emit light of a different lower frequency and is of critical importance since it can be extremely sensitive allowing the detection of single molecules and wherein many different fluorescent dyes can be used to stain different structures or chemical compounds including one particularly powerful method being the combination of antibodies coupled to a fluorophore as in immunostaining;
- Confocal—wherein a scanning point of light instead of full sample illumination is used to give slightly higher resolution, and significant improvements in optical sectioning;
- Single plane illumination microscopy and light sheet fluorescence microscopy—wherein a plane of light formed by focusing light through a cylindrical lens at a narrow angle or by scanning a line of light in a plane perpendicular to the axis of objective, allows high resolution optical sections to be taken; and
- Deconvolution—wherein the point spread function of the microscope imaging system is deconvolved by computer-based techniques in either two-dimensional or three-dimensional domains.

There are also a multitude of super-resolution microscopy techniques to circumvent the diffraction barrier including for example serial time-encoded amplified microscopy (STEAM). These are typically based upon imaging a sufficiently static sample multiple times and either modifying the excitation light or observing stochastic changes in the image. Additionally the knowledge of and chemical control of fluorophore photophysics are at the core of these techniques by which resolutions of approximately 20 nm are attainable.

Amongst the many biological systems of interest analysed with optical microscopy is the interaction between Actin and myosin, the two key contractile proteins in muscle. Such analyses have been studied for many years in the prior art using different techniques. Amongst such experiments in vitro Motility assays were extensively performed to obtain new information on the molecular mechanism of muscle contraction. Such assays take advantage of the ability to image rhodamine-phalloidin-labeled Actin filaments by fluorescence microscopy as they interact with and are translocated by myosin bound to a coverslip surface. In most studies on single Actin-myosin filament interactions, see for example Sellers in "In vitro Motility Assays with Actin" (Cell Biology Assays: Essential Methods, Ch. 20, Butterworth-Heinemann 2006), Jerry, and Yamada, the two contractile filaments are not imaged simultaneously due to technical challenges. In some studies, however, Actin and myosin filaments were visualized simultaneously by either using fluorescence reagents/labels attached to both Actin and myosin filaments (Yamada) or by using the combination of dark field and fluorescent microscopy techniques, see for example Kalganov et al in "A Technique for Simultaneous Measurement of Force and Overlap between Single Muscle Filaments of Myosin and Actin" (Biochemical and Biophysical Research Communications, Vol. 403, pp 351-356). Imaging both Actin and myosin filaments is important not only for visualization purposes but also for measuring filament overlap during active acto-myosin interactions because it should give new information about cooperative phenomena of myosin cross-bridges in myosin filaments.

Myosin is known as the molecular motor which converts chemical energy into mechanical work. Thus any chemical reagents attached to myosin for imaging purposes may or may not change the ability of myosin to do its work. For this reason it is critical to avoid using fluorescent reagents conjugated with myosin when a study on Actin and myosin interaction is to be done. The inventors in their previous work, see Kalganov Rassier, showed a technique where fluorescent labeling of myosin is not required for simultaneous imaging and force measurement. In that work a standard Nikon immersion dark field condenser was used to create dark field images of myosin filaments. The disadvantage of using the dark field condenser was in necessity to limit substantially the numerical aperture (NA) of the objective to form the dark field image. The objective's low NA caused Actin filaments to appear dark, hardly distinguishable from the background.

Within the prior art Vodyanoy et al in U.S. Pat. No. 7,688, 505 entitled "Simultaneous Observation of Darkfield Images and Fluorescence using Filter and Diaphragm" teach to a system employing an annular diaphragm and optical filter which are used for simultaneous observation of darkfield images and fluorescence. The diaphragm provides a variable diameter controlled by a lever and a removable filter which is used to adjust the amount of unfiltered incident light which produces the darkfield images when directed on a sample whilst the removable filter is used to filter light of the particular frequency for producing fluorescence images. However, Vodyanoy does not address the issues identified and discussed supra in respect of the NA of the optical system nor the requirement to use fluorescent reagents.

Accordingly it would be beneficial to provide an imaging technique which would allow simultaneous visualization of single Actin and myosin filaments as well as the filament overlap without requiring fluorescent conjugates for myosin filament visualization. It would be further beneficial for the imaging technique to improve, i.e. increasing, (Actin) filament image brightness contrast and signal-to-noise ratio (SNR).

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate drawbacks of the prior art with respect to optical microscopy and more particularly to providing adjustable acceptance angle dark filed illumination in conjunction with simultaneous fluorescence imaging.

In accordance with an embodiment of the invention there is provided a method comprising:
providing a sample mount forming a predetermined portion of a visual inspection system;
providing an imaging system comprising at least a lens for imaging a sample upon the sample mount;
providing an illumination system for coupling light to a predetermined region of the sample mount imageable with the imaging system, wherein
the illumination system only illuminates the predetermined region of the sample with light incident exceeding a predetermined angle to the axis of the imaging system.

In accordance with an embodiment of the invention there is provided a system comprising:
a sample mount forming a predetermined portion of a visual inspection system;
an imaging system comprising at least a lens for imaging a sample upon the sample mount;
an illumination system for coupling light to a predetermined region of the sample mount imageable with the imaging system, wherein
the illumination system only illuminates the predetermined region of the sample with light incident exceeding a predetermined angle to the axis of the imaging system.

In accordance with an embodiment of the invention there is provided a system comprising:

a plurality of optical emitters disposed at approximately constant radius from a location to be imaged;
an annular lens receiving the optical output from each optical emitter of the plurality of optical emitters and coupling these optical outputs to the location to be imaged;
an adjustable shield disposed on the inner edge of the annular lens, the adjustable shield varying the angular range of optical signals from the plurality of optical emitters coupled to the location to be imaged.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1A depicts a commercial opto-mechanical assembly providing a white short arc light source coupled to a liquid optical waveguide and a reflective collimator system according to an embodiment of the invention to couple the liquid optical waveguide to a multimode silica optical waveguide for subsequent coupling to an optical microscopy test system according to an embodiment of the invention;

FIG. 1B depicts an opto-mechanical assembly providing a reflective collimator system according to an embodiment of the invention such as depicted in FIG. 1A to couple a liquid optical waveguide to a multimode silica optical waveguide;

FIG. 1C depicts a schematic presenting an effective point light source model exploited to design a reflective collimator system according to an embodiment of the invention such as described in FIGS. 1A and 1B to couple a liquid optical waveguide to a multimode silica optical waveguide;

FIG. 2D depicts a holder for an optically accessible experimental bath according to an embodiment of the invention;

FIGS. 2E and 2F depict top and bottom elevation views of an illuminating chamber and optically accessible experimental bath according to an embodiment of the invention;

FIG. 3A depicts a cross-section three-dimensional schematic of an illuminating chamber and optically accessible experimental bath according to an embodiment of the invention with multimode silica optical waveguide illumination;

FIG. 3B depicts a holder for an optically accessible experimental bath according to an embodiment of the invention as discrete element with optical coupling elements and assembled;

FIGS. 5A and 5B depict a visual comparison of Thick muscle filament appearance imaged with a prior art dark field condenser system and an optical illumination assembly according to an embodiment of the invention respectively;

FIGS. 14A through 14C depicts a background image subtraction procedure exploiting data captured with an optical illumination assembly according to an embodiment of the invention wherein FIG. 14B is subtracted from FIG. 14A to yield FIG. 14C;

DETAILED DESCRIPTION

Figure 2A:
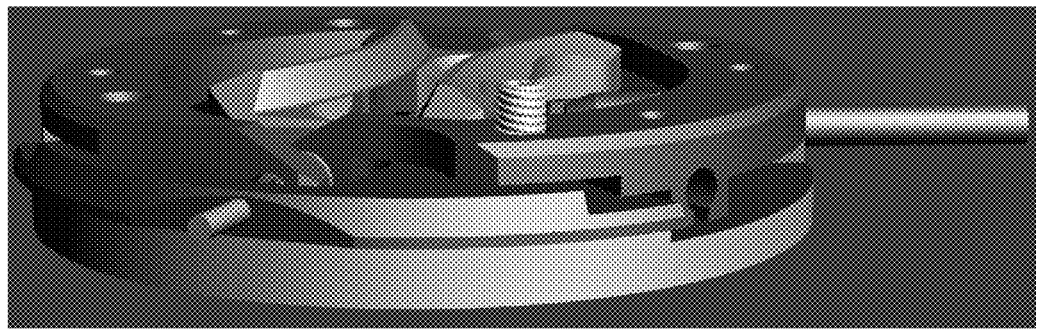
FIG. 2A depicts a schematic of an illuminating chamber and optically accessible experimental bath according to an embodiment of the invention.

The present invention is directed to optical microscopy and more particularly to providing adjustable acceptance angle dark filed illumination in conjunction with simultaneous fluorescence imaging.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Within microscopy a lot of attention is normally paid to what magnification and resolution of objective was employed in the image acquisition but the very important aspect of how the sample was illuminated is usually dismissed. In order to develop an imaging technique to simultaneously visualize single Actin and myosin filament the inventors considered combining fluorescent microscopy and dark field microcopy, i.e. to use light scattered as well as that reflected and refracted from the sample in order to form the image of the object being imaged. However, conventional dark field microscopy does not work well in this arrangement as it requires the numerical aperture (NA) of the imaging objective be restricted. As presented below in respect of Equation (1) the NA of a lens defines the angular cone of light that can be accepted or exit the lens.

$$NA = n \cdot \sin(\theta) \quad (1)$$

where n is the refractive index within which the lens is working, e.g. air n=1.00, and θ is the half-angle of the maximum cone of light that can enter or exit the lens.

For a typical optical microscopy system when forming dark field images the NA≈0.8, or θ≈53°, which leads to very poor quality for simultaneous fluorescent imaging. Imaging fluorescently labeled Actin filaments requires high objective NA, typically in the range of NA≈1.2-1.4. As evident from Equation (1) such high NA's can only be achieved with immersion of the lens into a medium with n>1.0, i.e. an oil with n≈1.5. This high NA allows for the image to be bright, as the Actin filament brightness is proportional to $NA^4$, and the objective works as an objective and a condenser at the same time. Limiting the objective's NA for dark field imaging is necessary because the angle at which the sample is illuminated with the condenser lens has to be higher than the angle of acceptance of the objective so that light is unable to come directly into the objective. When an oil immersion high NA objective (1.2-1.4 NA) is used it becomes theoretically impossible to outperform its acceptance angle if a dark field condenser is immersed in a water solution which has lower refractive index than the oil ($n_{water}$=1.333, $n_{Oil}$=1.515).

This is a common problem for any applications where biological samples are to be imaged as they typically require water solutions to perform the experiments within. One potential solution to the problem is to add oil to the experimental solution to increase its refractive index and therefore the angle of illumination. However, such oil-water emulsions and/or solutions will impact the biological system being imaged and analysed. Accordingly in order to overcome this limitation within the prior art the inventors undertook to design an illumination system such that the light would be coupled onto the sample at higher angles than the objective could accept such that only scattered light from the sample would be used by the objective to form an image. As noted above during dark field imaging the objective's NA had to be 0.8, which for oil immersion using an oil with n≈1.52, defines an acceptance angle of θ≈31.76°. Accordingly, an optical imaging system according to an embodiment of the invention for simultaneous fluorescent imaging and dark field imaging it is necessary to illuminate the sample at a higher angle than θ=31.76° in order to be able to increase the NA of the objective above 0.8. For an NA=1.4 objective using an oil with n≈1.52 its angle of acceptance is calculated to be θ=67.08°. Based on such considerations the inventors according to embodiments of the invention have designed and implemented an illumination system with a continuously adjustable angle of illumination of 65°≤θ≤90° allowing use of the full objective aperture and also allowing determination of the angle at which the samples appear brightest or highest contrast.

Designing and Engineering the Illumination System:

A first consideration in respect of the dual function microscopy system according to an embodiment of the invention is the focusing of the light from a white light source into a multimode optical fiber in order to couple it into the experimental chamber. A large core (1 mm) low NA (0.22) fused silica high OH optical fiber was selected. Whilst a lager fiber core allows for the collection of more light from the white light source a lower NA defines a lower exit angle of the light beam from the fiber which reduces the complexity of collimation allowing a smaller lens assembly. The fiber was chosen due to the low attenuation in the working wavelength region of the biological experiments, this being 500 nm≤λ≤600 nm. An illumination system of four optical fibers to bring light to the sample from four different sides was adopted to provide symmetrical illumination.

The fused silica optical fibers were jacketed and connectorized with SMA905 connectors at one end and with smaller ST connectors at the other end. Each optical fiber was coupled to a different optical source, these being one 250 W halogen light source (ARC-TS-428 from Princeton Instruments) and three 120 W electric arc light sources such as normally used to excite fluorescence in microscopy (X-Cite Series 120 from EXFO Lumen Dinamics). These electric arc light sources 100A, as depicted in FIG. 1A, are supplied with 1.5 m long liquid light guide 100B having a 3 mm core diameter and a NA of 0.3 NA. Accordingly, an optical coupler 100C was designed to couple the 3 mm 0.3 NA liquid core fiber guide to the 1 mm 0.22 NA fused silica fiber guide. The optical coupler 100C as depicted in FIG. 1B the light from the liquid fiber guide was collimated with an aspheric anti-reflection coated lens 130 of diameter 12 mm having a focal length of 10 mm and NA 0.545 which is higher than the optical guide NA of 0.3.

It would be evident that collimating an optical guide is not done perfectly as the core is relatively large and the core accordingly acts as multiple sources originating at different points on the optical light guide tip and having a wide range of exit angles such that the end of the optical light guide face cannot be described precisely by the traditional point light source model. Notwithstanding this the inventors collimated the light from the liquid guide using effective point light source model as depicted in FIG. 1C. In this model an imaginable (virtual) point light source, S, inside of the fiber located on the central fiber axis at a certain distance d from the fiber tip. This distance can be calculated taking into account the fiber NA which describes the maximum half exit angle θ and the radius of the light guide, r. Equation (2) defines this geometric construction wherein θ is the half exit angle and can be found as given by Equation (3).

$$\frac{r}{d} = tg(\theta) \quad (2)$$

$$\theta = \arcsin(NA) \quad (3)$$

$$d = \frac{r}{tg(\arcsin(NA))} \quad (4)$$

Accordingly, for NA=0.3 and r=1.5 mm, and from Equation (4) from re-arranging Equation (3) d=4.77 mm. Accordingly, an effective point light source placed at the focal point of the lens will produce a collimated beam. Therefore the light guide tip should be positioned at a distance $F_d$–d from the lens surface where $F_d$ is the lens focal distance. Accordingly, the light guide tip should be positioned at 10.00 mm–4.77 mm=5.23 mm away from the surface of the aspheric anti-reflection coated lens 130. After the aspheric anti-reflection coated lens 130 the collimated optical beam is coupled to a parabolic mirror reflective collimator 160, in one embodiment an RC08SMA-P01 from Thor Labs. This provides an 11 mm clear aperture for the input collimated light and it's NA of 0.167 which is lower than the fused silica fiber NA of 0.22 and therefore allows for low loss coupling to the fused silica fiber. This parabolic mirror reflective collimator 160 has a constant focal distance over a large wavelength range and therefore has neither chromatic nor spherical aberrations in contrast to regular lenses. The other end of the parabolic mirror reflective collimator 160 was fitted with a multimode silica waveguide coupling 170, namely an SMA905 optical connector.

The end of the parabolic mirror reflective collimator 160 towards aspheric anti-reflection coated lens 130 has a 0.5" diameter interface with external threading compatible with standard 0.5" diameter lens tubes from the same supplier. As a result a 2" long, 0.5" diameter lens tube was employed to house and align the remaining optical elements within the optical coupler 100C. The collimating lens, aspheric anti-reflection coated lens 130, is held by a pair of retaining rings, not shown for clarity. A pair of small optics 5 mm diameter ring adapters 110 were installed in the lens tube at 10 mm distance from each other and held with additional retaining rings, not shown for clarity. The liquid guide metal connector 120, having 5 mm external diameter and length 20 mm, was inserted in these ring adapters and in this manner aligned against the aspheric anti-reflection coated lens 130 with the desired 5.23 mm separation. To hold the liquid guide metal connector 120 tight a threaded hole was made in the lens tube wall at 22 mm away from the edge where the light guide connector entered and an M3 screw employed to tighten the assembly. A standard GG400 UV glass filter 150, 12.5 mm diameter and 2 mm thick, was also inserted to block UV emissions as the arc light sources produce a strong UV radiation that can be dangerous for a user of the illumination system. This GG400 UV glass filter 150 may placed between the aspheric anti-reflection coated lens 130 and the parabolic mirror reflective collimator 160 as shown in the FIG. 1B or between the aspheric anti-reflection coated lens 130 and tip of the liquid guide metal connector 120.

The light from the 250 W halogen light source was focused into its fused silica optical fiber with a different optical configuration. The 250 W halogen light source comprises an internal mirror which focuses light from the halogen bulb into a rectangular 6×4 mm illumination zone. The focal plane is located outside of the light source housing about 7 mm away as the mirror has a long 147 mm focal distance and 70 mm diameter. Accordingly the exiting light comes out with relatively low divergence, ~13.4°, such that it could be coupled directly into a reflective collimator, such as parabolic mirror reflective collimator 160, to focus the light into the fiber. To align the reflective collimator against the light source the collimator was mounted in an optics mount which was in turn mounted on a 0.5" diameter 2" long optical post which was inserted in a 0.5" diameter 2" long post holder and therein into a post holder base. To block UV radiation from this light source a GG400 UV glass filter may be placed inside of the same optics mount where the collimator is mounted.

Ray Transfer Matrix Analysis:

Light exiting each optical fiber on the sample end requires focusing to a small spot in order to maximize the density of light and hence illumination intensity of the sample. The smaller the spot size the higher the irradiance from the sample and the brighter the sample's appearance but on the other hand machining tolerances put some restrictions on how small the spot size should be. In the embodiments of the invention described below in respect of FIGS. 2 through 15 a spot size of less than 1 mm diameter was considered out of bounds as machining tolerances would otherwise mean that the focal regions from the four fibers will not overlap. It would be evident that other machining tolerances may allow for smaller overlap regions, or in other embodiments of the invention larger overlap regions, to be established.

Accordingly, it was decided to keep light spot diameter within the range 1.0 mm≤diameter≤3.0 mm. The light spot diameter may also vary according to the intensity settings of the light source. To focus light exiting each fused silica optical fiber in such a spot size a dual lens combination, a plano-convex thin spherical lens and a plano-convex cylindrical lens, was employed although other optical designs may be employed without departing from the scope of the invention. Design of this lens assembly was undertaken by ray transfer matrix analysis was performed wherein as the light travels from a light source and passes through different optical interfaces the light beam diameter, x, as well as its divergence, θ, can be calculated using matrix algebra. Although the fused silica optical fiber has a circular spot it is necessary to consider the more generic case of an elliptical light spot which has half-axes, $\{x_s, x_p\}$, and divergences, $\{θ_s, θ_p\}$. These two components are needed as one of them, $x_s$, will experience focusing effect at the curved interface of the cylindrical lens and the other one, $x_p$, will not. Thus at the sample an elliptical instead of circular light spot with the dimensions $\{x_s, x_p\}$, and divergences, $\{θ_s, θ_p\}$ will be generated.

To simplify slightly the calculations the same effective point light source model to approximate the behavior of light exiting the fiber tip, similar to above in respect of the consideration of designing the liquid light guide to fused silica coupling. In this model we have a virtual point light source located on the fiber optical axes inside of the optical fiber. The light emitted by this effective point light source has zero initial dimensions, $\{x_s=0, x_p=0\}$ and travels inside of the fiber a certain distance $d_{fiber}$. After the light exits the fiber it travels certain distance in air $d_{air}$ before it hits the plano-convex spherical thin lens. After passing this lens the light travels again certain distance in air, $d_{air2}$, before it hits the curved interface of the cylindrical lens where the $x_s$ and $x_p$ components of light have different behavior, namely $x_s$ gets focused but $x_p$ simply refracts like at a flat interface. Then, at the rear flat interface of the cylindrical lens both $x_s$ and $x_p$ components have a simple refraction which is neglected in our model due to small refractive index difference between lens glass and water. Further, the light travels a certain distance in water, $d_{water}$, until it reaches the sample. The matrices describing behavior of light at optical interfaces are given below in Equations (5) through (8).

Propagation in constant index medium:

$$\begin{pmatrix} 1 & d \\ 0 & 1 \end{pmatrix} \quad (5)$$

Refraction at a flat interface is:

$$\begin{pmatrix} 1 & 0 \\ 0 & \frac{n_1}{n_2} \end{pmatrix} \quad (6)$$

Refraction at a curved interface is:

$$\begin{pmatrix} 1 & 0 \\ \frac{n_1 - n_2}{R \cdot n_2} & \frac{n_1}{n_2} \end{pmatrix} \quad (7)$$

Thin Lens is:

$$\begin{pmatrix} 1 & 0 \\ -\frac{1}{f} & 1 \end{pmatrix} \quad (8)$$

Knowing these matrices we can write two algebra matrix equations for the $\{x_s, x_p\}$ components of the light spot as given in Equations (9) and (10) below.

$$\begin{bmatrix} x_s \\ θ_s \end{bmatrix} = \begin{bmatrix} 1 & d_{glass/water} \\ 0 & 0 \end{bmatrix} \begin{bmatrix} 1 & 0 \\ \frac{(n_{air} - n_{glass})}{R_0 \cdot n_{glass}} & \frac{1}{1.5} \end{bmatrix} \begin{bmatrix} 1 & d_{air2} \\ 0 & 1 \end{bmatrix} \begin{bmatrix} 1 & 0 \\ -\frac{1}{f} & 1 \end{bmatrix} \begin{bmatrix} 1 & d_{air} + d_{fiber} \\ 0 & 1 \end{bmatrix} \begin{bmatrix} 0 \\ θ_{fiber} \end{bmatrix} \quad (9)$$

$$\begin{bmatrix} x_p \\ θ_p \end{bmatrix} = \begin{bmatrix} 1 & d_{glass/water} \\ 0 & 0 \end{bmatrix} \begin{bmatrix} 1 & 0 \\ 0 & \frac{1}{1.5} \end{bmatrix} \begin{bmatrix} 1 & d_{air2} \\ 0 & 1 \end{bmatrix} \begin{bmatrix} 1 & 0 \\ -\frac{1}{f} & 1 \end{bmatrix} \begin{bmatrix} 1 & d_{air} + d_{fiber} \\ 0 & 1 \end{bmatrix} \begin{bmatrix} 0 \\ θ_{fiber} \end{bmatrix} \quad (10)$$

Here $θ_{fiber}$ is the maximum half exit angle of the fiber and can be calculated as $θ_{fiber}=\arcsin(NA_{fiber})$. Under an initial condition ($x_{s0}=0$, $x_{p0}=0$), as the light starts from a point light source. Other variables are refractive index of the lens glass $n_{glass}$, radius of curvature of the cylindrical lens $R_0$, and focal distance of the thin spherical lens f. As a first approximation $θ_s$ and $θ_p$ can be set to zero meaning parallel light coming onto the sample and this system of equations can be solved analytically relative to $R_0$ and f for 1.0 mm≤$x_s$,$x_p$≤3.0 mm allowing the lenses to be specified.

Collimating Adapters for Optical Fibers:

In order to realize the optical model described supra initially collimating adapters for the fused silica optical fibers were designed and implemented using single spherical anti-reflection coated plano-convex lenses of diameter 6.0 mm and focal length 10 mm. Their NA of 0.287 was chosen to be higher than the fiber's NA of 0.22. These lenses allowed compact design of the collimating adapters. Threading was implemented within the collimating adapters and on the ST connectors of the optical fibers such that the adapters could be screwed on the ST connectors. Thus by turning the collimating adapters we could move them forth and back along the ST connectors, i.e. closer or further away from the fiber tip, such that depending on the experimental requirements can focus or collimate the light beam exiting the fiber. Based on the optical model described in the previous section the threading on the ST connector and inside of the collimating adapter was implemented to allow the collimating lens to travel from 5 mm to 10 mm away from the fiber tip. It would be evident that other optical configurations would be possible without departing from the scope of the invention.

Illuminating Chamber:

To allow continuous adjustments of the angle of illumination of the optical fibers a chamber was designed as depicted in respect of FIGS. 2A through 2H. The illuminating chamber (ILUC) consists of two metal frames, each made in a shape of a semi-circle having a radius of 50 mm and being 16 mm wide and 7.5 mm thick. These frames are connected to a 100 mm diameter and 6 mm thick round metal base via two metal rods, each 3 mm in diameter and 27 mm long located on the opposite sides of the round base. These metal rods serve as an axis of rotation for the frames. In the center of the base of the chamber a rectangular recess of dimensions 22×50 mm is provided, matching the dimensions of a standard microscope cover slip, allowing placement of a cover slip and an experimental bath providing controlled experimental environments.

A threaded hole in the surface of each frame was drilled and a threaded knob was put in each hole. Two circular fiber connector holders were made on the bottom surface of each frame as shown in FIGS. 2A through 2H respectively. Optical fiber connectors were inserted in these holders and fixed in the required orientations such that the light from the four fused silica optical fibers would fall onto the surface of the cover slip in the same location at the centre of the cover slip. By turning the knob, the frame which carries the optical fibers would move up or down around the metal rods thereby adjusting its angle of orientation relative to the horizontal plane. Thus the vertical angle at which the optical fibers illuminate the center of the chamber would be accordingly adjusted.

Optically Accessible Experimental Bath:

A design requirement of the illumination technique was to provide high angle of illumination requiring that the walls of the optically accessible experimental bath (OPAXB) be transparent to visible light. In this manner light can travel from the collimating adapters to the sample through the walls which would allow up to 90 degrees illumination angle. Accordingly, the experimental based was designed based upon an aluminum bath 45 mm long, 10 mm wide and 10 mm high machined such that it had four empty rectangular windows each 9 mm long and 6 mm high on its two long sides. These pairs of windows on each side of the bath were separated by 2 mm wide metal surface which was used to make 1 mm diameter holes to insert metal tubes providing solution flow during experiments. To permit optical coupling from the collimating adapters through the windows anti-reflection coated plano-convex cylindrical lenses were chosen, as defined from the preceding design analysis. In this instance lenses with a radius of curvature of 15.5 mm and back focal length 26.3 mm were employed. These lenses were custom cut in 8 equal pieces 6.0±0.1 mm long and 8.75±0.1 mm high which were then aligned such that four pieces of the cylindrical lens were in the windows of the bath such that the curved surface of the lens was outside of the bath and flat surface of the lens was inside of the bath.

This cylindrical lens was made from N-BK7 glass having a refractive index $n_g=1.519$ at $\lambda=550$ nm. If the OPAXB is empty, i.e. there is a glass-air interface on the flat surface of the cylindrical lens then due to the large refractive index difference between air, $n=1.0$, and the lens glass, $n_g=1.519$, the light beam is going to refract at the interface and miss the center of the cover slip surface. However, when the experimental bath is filled with the water based experimental solution then the refractive index difference between the water, $n=1.333$, and the lens glass is reduced significantly small and accordingly the deflection of the light beam will be negligible and the light from all four optical fibers will impinge as intended at the center of the cover slip surface. To allow the OPAXB to mount inside the chamber four magnets were glued into the four corners of the rectangular recess of the chamber and correspondingly in the corners on the bottom of the OPAXB.

Figure 2B:
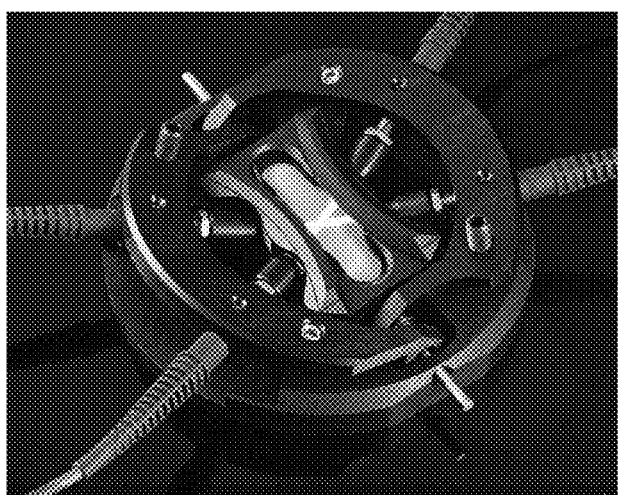
FIG. 2B depicts an optical micrograph of an illuminating chamber and optically accessible experimental bath according to an embodiment of the invention with multimode silica optical waveguide illumination.
Figure 2C:
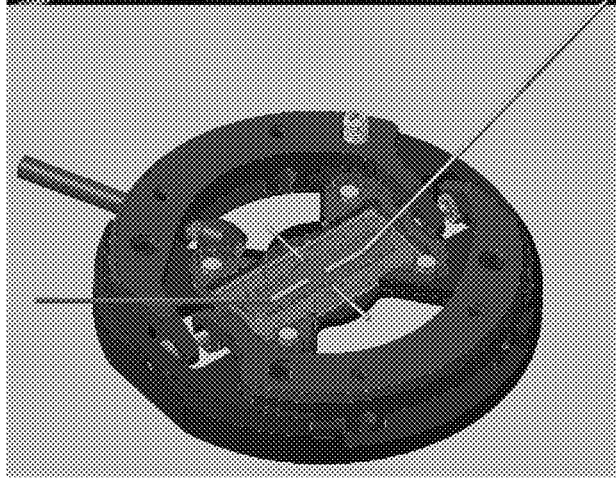
FIG. 2C depicts an schematic of an illuminating chamber and optically accessible experimental bath according to an embodiment of the invention with electrical excitation/biological restraint elements in place.
Figure 4A:
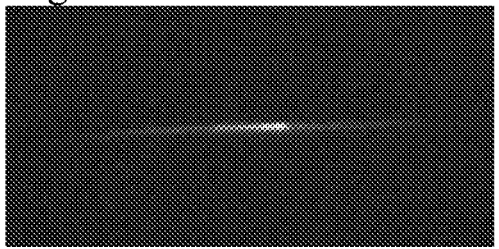
FIGS. 4A through 4I depict optical micrographs of two Thick filaments isolated from muscles imaged with an optical illumination assembly according to an embodiment of the invention wherein Thick filaments become brighter the intensity of illumination is increased.
Figure 4B:
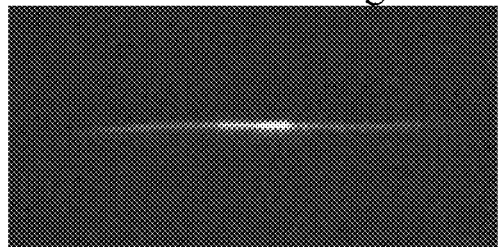
Figure 4C:
Figure 4D:
Figure 4E:
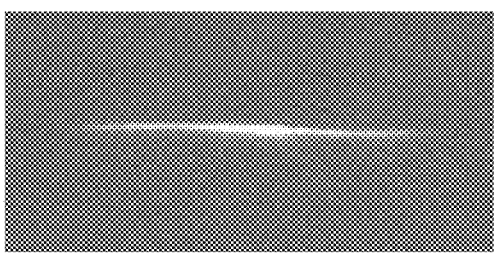
Figure 4F:
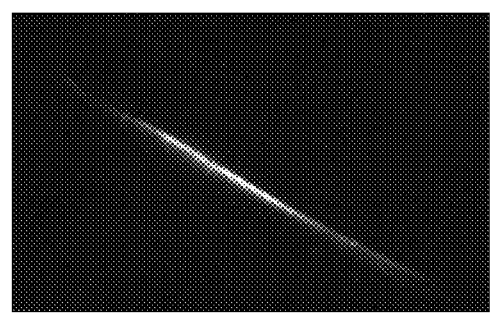
Figure 4G:
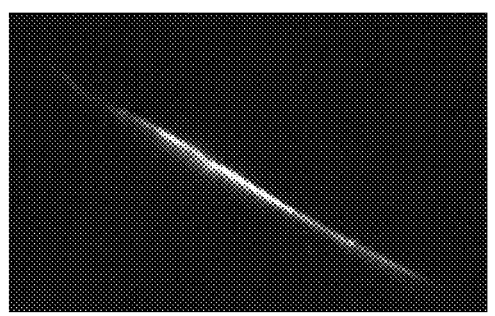
Figure 4H:
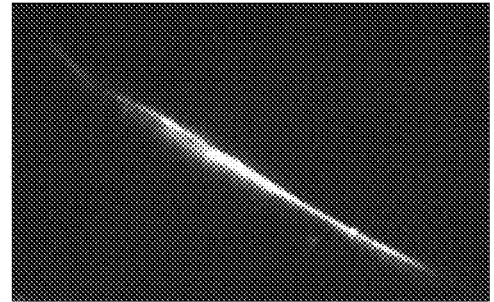
Figure 4I:
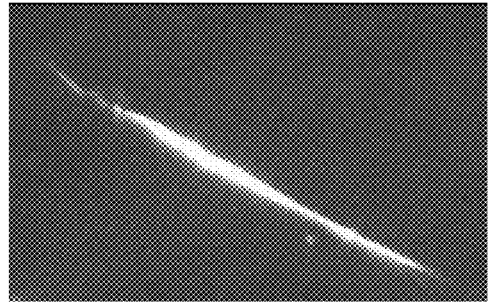
Figure 6A:
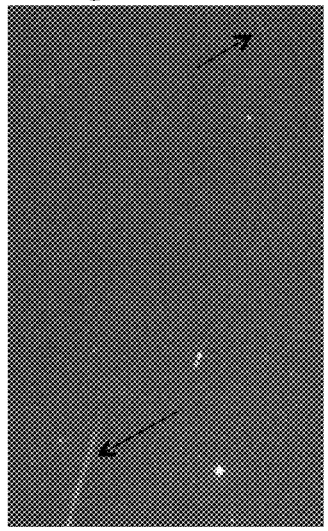
FIGS. 6A and 6B depict simultaneous imaging of single Thick and Actin muscle filaments using prior art dark field condenser.
Figure 6B:
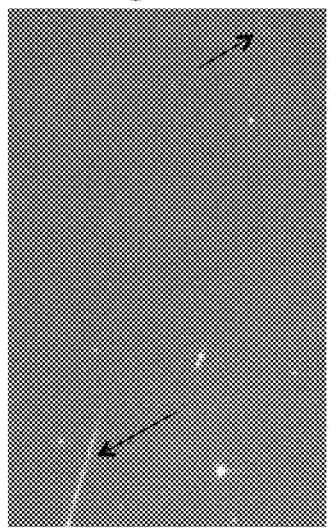
Figure 6C:
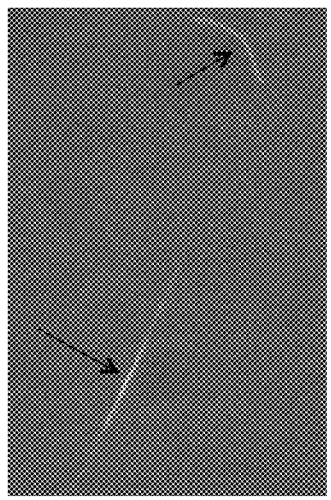
FIGS. 6C through 6E depict simultaneous imaging of single Thick and Actin muscle filaments using an optical illumination assembly according to an embodiment of the invention.
Figure 6D:
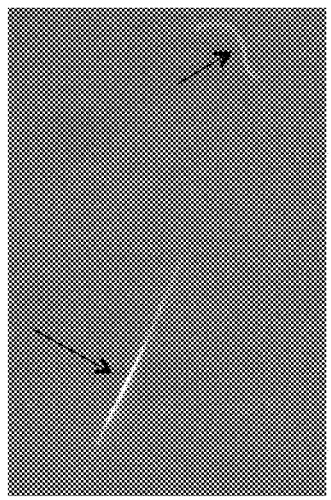
Figure 6E:
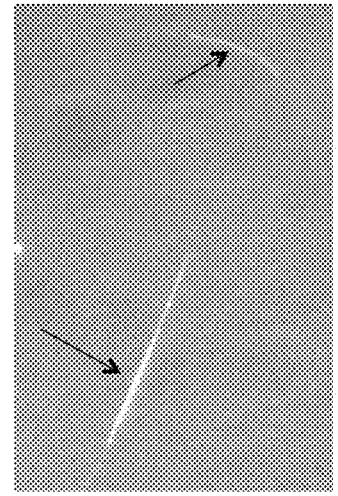
Figure 7A:
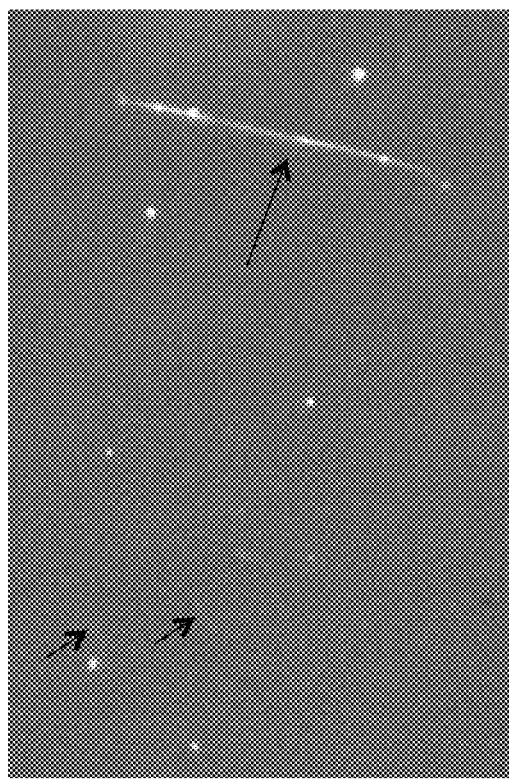
FIG. 7A depict simultaneous imaging of single Thick and Actin muscle filaments using prior art dark field condenser.
Figure 7B:
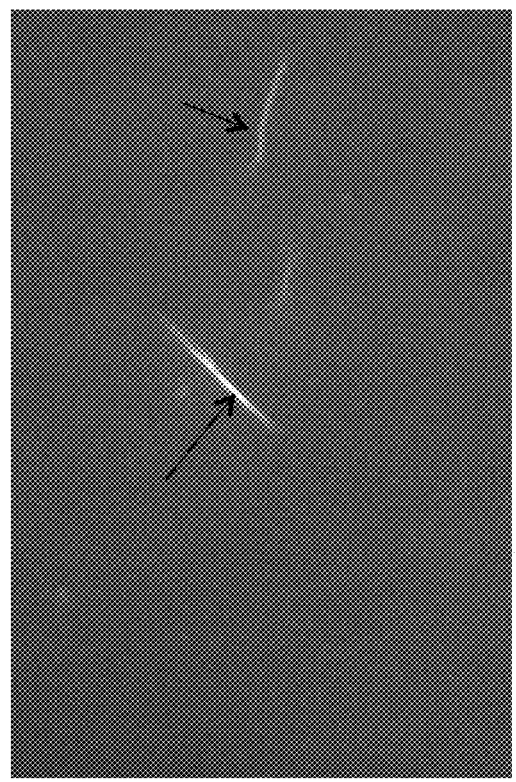
FIGS. 7B and 7C depicts simultaneous imaging of single Thick and Actin muscle filaments using an optical illumination assembly according to an embodiment of the invention.
Figure 7C:
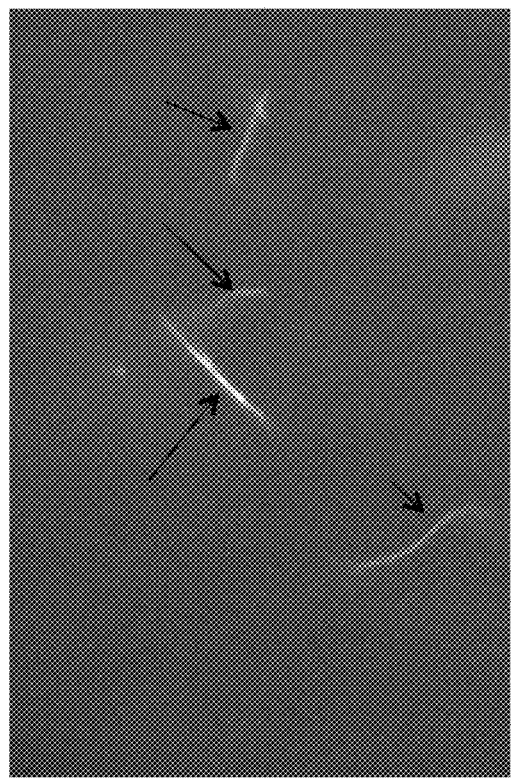

Accordingly, the OPAXB and ILUC are depicted in FIGS. 2A through 2F, 3A and 3B respectively, wherein:

FIG. 2A depicts the ILUC and OPAXB according to an embodiment of the invention;

FIG. 2B depicts an optical micrograph of the ILUC and OPAXB according to an embodiment of the invention with the fused silica optical fibers and collimators assembled;

FIG. 2C depicts the ILUC and OPAXB according to an embodiment of the invention with electrical excitation/biological restraint elements in place;

FIG. 2D depicts a holder for an OPAXB according to an embodiment of the invention;

FIGS. 2E and 2F depict top and bottom elevation views of the ILUC and OPAXB according to an embodiment of the invention with a single fused silica optical fiber and collimator assembly;

FIG. 2G depicts a cross-section three-dimensional schematic of the ILUC and OPAXB according to an embodiment of the invention;

FIG. 2H depicts top and bottom views of the holder for an OPAXB according to an embodiment of the invention together with the optical coupling elements as discrete elements.

Microscope System:

The experiments and tests reported below in respect of FIGS. 4 through 14 were performed using a microscope system consisting of a Nikon Eclipse TE 2000 Microscope, a Nikon Plan-Fluor 100X/0.5-1.3 oil immersion objective which is suitable for bright field, dark field and fluorescent microscopy measurements, a Nikon immersion dark field condenser 1.2-1.43 NA, and Rolera-MGi EMCCD video camera with a frame rate of 31 fps and magnified pixel size of 150 nm. Within this assembly in the filter chamber a standard high efficiency filter set was employed for the 450 nm≤λ≤490 nm high efficiency exciter was used and the standard emission filter was replaced with a custom designed high efficiency 500 nm≤λ≤600 nm emission filter which allowed use of the strong $\lambda=550$ nm peak of the arc lamps for optical fiber illumination. Another arc light source of the same model was used to excite Alexa 488-phallodin fluorescent dye used as the fluorescent label for the Actin filaments.

Brightness, Contrast and SNR Definitions:

To evaluate the quality of the images obtained with the experimental configuration according to an embodiment of the invention and compare image quality for different imaging techniques three image parameters were evaluated, namely relative brightness, contrast and signal-to-noise ratio (SNR). These image parameters can have different definitions depending on field and application so for clarity our definitions are provided here.

During experiments with the illumination configuration and OPAXB according to an embodiment of the invention 8-bit gray scale images are acquired in audio-video interleaved (AVI) format. An 8-bit gray scale image means that the intensity of every pixel of this image can vary from 0 corresponding to totally black pixel to 255 corresponding to totally white pixel. Brightness of an object in this case is basically average intensity of pixels of the object ranging from 0 to 255 gray values. Based on this we define the relative brightness of the object as $B_r=I_0-I_b$, where $I_0$ is average 8-bit intensity of the pixels in the object and $I_b$ is the average 8-bit intensity of the pixels in the background. $B_r$ basically shows the brightness of the sample relative to the background i.e. how bright the object would appear if background level was 0. Using relative brightness instead of just brightness allows comparing different experiments with different background levels.

Contrast, C, shows by how many times the object is brighter than the background and is accordingly defined as $C=I_0/I_b$. SNR is defined by Equation (11) below where $\sigma_0$ is the standard deviation of pixels in the object that describes the noise in the object, and $\sigma_b$ is the standard deviation of pixels in the background that describes the noise in the background.

$$SNR = \frac{(I_0 - I_b)}{\sqrt{(\sigma_0^2 + \sigma_b^2)}} \quad (11)$$

Image analysis to determine pixel intensity and pixel standard deviation was performed using the ImageJ program created at the National Institutes of Health. Determining $\sigma_0$ within the exemplary application of Actin filaments is relatively straight-forward as they are uniform. For the thick filaments it is more problematic as they are not uniform along their length and accordingly, the central (brightest) portion of the thick filament was employed wherein the average brightness remains constant to within a predetermined range, for example ±10%. $I_0$ however was measured for the whole thick filament. A polygon selection tool within the program was used to draw a closed line along the object's edge such that the average intensity and standard deviation of the pixels within the object may be obtained. Similarly average intensity of the background was obtained for two spots in the image. One measurement was taken next to the location of the object and the other measurement was taken in the darkest corner of the image. Both background values were used to calculate relative brightness, contrast, and SNR of the object. This approach with two background level measurements allows correcting for brightness gradient across the image in case the background is not uniform and obtaining more objective values of the image parameters.

Within this exemplary embodiment of the invention background brightness was measured using the average background value excluding those brightest regions of the image which are formed by other filaments, contaminations of solution, etc whether in or out of focus. Such artifacts are irrelevant to the measurements and may appear/disappear in different experiments. Accordingly, for consistency between experiments those regions where other filament and contaminants were present were excluded whether in or out of focus.

Muscle Protein Preparation and Motility Experiments:

Two muscle protein filaments were used in the studies described below in respect of FIGS. 4 through 14. These being Actin filaments and Thick filaments. Actin was purchased from Cytoskeleton in powder form before being re-suspended in a pH 7.0 Actin storage buffer solution containing as active elements 0.1 M potassium chloride (KCl), 4 mM Imidazole, 2 mM magnesium chloride (MgCl$_2$), 1 mM sodium azide, 0.5 mM adenosine triphosphate (ATP), and 1 mM dithiothreitol (DTT)d. Under these conditions Actin self-polymerizes into filaments. Actin filaments were stained with Alexa Fluor 488 Phalloidin fluorescent dye according to a standard procedure. Native Thick filaments consisting primarily of myosin were isolated following a standard procedure from the anterior byssus retractor muscles of bivalve Mollusca (mussels) and stored in a pH 7.0 Thick filament buffer containing as active elements 10 mM piperazine-N,N'-bis(2-ethanesulfonic acid) (PIPES), 10 mM MgCl$_2$, 2 mM ethylene glycol tetraacetic acid (EGTA), and 2 mM DTT without any ATP.

Motility experiments were performed using the following basic procedure with slight modifications. Initially, a standard 22×50 mm cover slip was treated with ethanol which was allowed to evaporate before the cover slip was attached onto the bottom of the OPAXB using high vacuum grease. The OPAXB was installed in the recess of the ILUC and retained using the magnets. The ILUC with the optical fibers connected was then placed onto the microscope table, fixed tight with the ILUC retaining plates using M3 screws and centered relative to the position of the objective lens. Thick filaments were diluted by 1000 times in 5 ml of AB/BSA/GOC/DTT/ATP with calcium (Ca) solution containing 25 mM Immidazol-HCl (pH 7.4), 25 mM KCl, 4 mM MgCl$_2$, 1 mM EGTA, 1 mM DTT, 0.5 mg/ml Bovine serum albumin (BSA), 0.018 mg/ml Catalase, 0.1 mg/ml Glucose Oxidase, 3 mg/ml Glucose, 100 μM ATP, 20 mM DTT, 2 mM calcium chloride (CaCl$_2$) and were put in the OPAXB to fill it up. Such a large dilution was employed so that it was possible to observe around one Thick filament per field of view in order to reduce the level of background and background noise which is critical when measurements of brightness contrast and SNR are to be taken. Thick filaments were let to settle for 5-10 minutes.

Next the optical fiber illumination was turned on and one or a couple of Thick filaments were detected. Angle of illumination, collimating adapters positions, light sources intensity were adjusted such that the brightness of the Thick filaments was maximized and the brightness of background minimized. Actin filaments were also diluted in AB/BSA/GOC/DTT/ATP/Ca to 67 ng/ml and then 10 μl of this solution was added into the OPAXB near the center of the cover slip where a Thick filament was located. Fluorescent excitation illumination was turned on and after approximately 1 to 5 minutes a few Actin filaments were observed in the field of view floating slightly above the cover slip surface near the Thick filament. Waiting for another 5-10 minutes was usually sufficient to begin observation of an Actin filament landing and sliding on the Thick filament which could then be imaged simultaneously using the optical microscopy system according to an embodiment of the invention. Images of the motion of Actin filaments simultaneously visualized with Thick filaments were recorded and stored on the computer for further analysis.

Comparison Between Prior Art Nikon Dark Field Condenser and New Illumination Technique for Muscle Filament Imaging.

Simple Imaging:

Initially the ability of the ILUC and optical illumination system according to an embodiment of the invention were evaluated for visualizing Thick filaments. Referring to first image set depicted in FIGS. 4A through 4E respectively and second image set depicted in FIGS. 4F through 4I respectively each image set depicts a Thick filament imaged with the ILUC. The intensity of the illumination light sources was increased during these image sets allowing control of the brightness of the filaments.

Subsequently, a few Thick filaments were imaged with a Nikon dark field condenser objective, FIG. 5A, as well as with the ILUC according to an embodiment of the invention, FIG. 5B. The imaging quality was compared subjectively, i.e. visually, as well as objectively using ImageJ analysis and measurements of relative brightness, contrast and image SNR as presented below in Table 1. It can be seen from the images in FIGS. 5A and 5B that subjectively the appearance of Thick filaments is similar in both cases. Similarly, relative brightness, contrast and SNR values derived from the images likewise show no significant difference of imaging quality irrespective of whether the Thick filaments were imaged with the Nikon dark field condenser, i.e. NA 0.8, or with the ILUC, NA 1.2. These being shown in first and second lines of Table 1 identified as Thick—Dark and Thick—ILUC respectively.

TABLE 1

Experimental Results for Dark Field and ILUC Imaging (Note 1)

| | Relative Brightness Average | Std. Dev. Relative Brightness | Contrast Average | Std. Dev. Contrast | SNR Average | Std. Dev. SNR |
|---|---|---|---|---|---|---|
| Thick - Dark | 95.36 | 22.11 | 2.06 | 0.34 | 6.01 | 1.63 |
| Thick - ILUC | 108.54 | 31.52 | 2.93 | 1.13 | 7.34 | 1.68 |
| Simult. - Dark | 57.07 | 28.26 | 1.57 | 0.27 | 4.67 | 1.73 |
| Simult. - ILUC | 71.38 | 20.69 | 1.93 | 0.43 | 5.60 | 1.11 |
| Actin - Dark | 13.37 | 2.25 | 1.17 | 0.065 | 1.51 | 0.43 |
| Actin - ILUC | 61.31 | 9.79 | 1.98 | 0.348 | 6.31 | 1.11 |

Thick - Dark: Nikon dark field condenser lens, Thick filaments only, n = 10;
Thick - ILUC: ILUC according to embodiment of the invention, Thick filaments only, n = 54;
Simult. - Dark: Nikon dark field condenser lens, Thick filaments simultaneously, n = 34;
Simult. - ILUC: ILUC according to embodiment of the invention, Thick filaments simultaneously, n = 28;
Actin - Dark: Nikon dark field condenser lens, Actin filaments simultaneously, n = 14;
Actin - ILUC: ILUC according to embodiment of the invention, Actin filaments simultaneously, n = 53.
(Note 1:
Where the thick filament relative brightness was less than 50 gray scale units these thick filaments were not taken into account as they would not be used in real experiment)

Next imaging tests were performed using both Actin and Thick filaments simultaneously. Using the Nikon dark field condenser illumination the objectives NA was again 0.8 and Thick filaments were clearly visualized whereas Actin filaments were dark and hard to distinguish in the background, see FIGS. 6A, 6B and 7A respectively. Subsequently, using the new illumination technique according to an embodiment of the invention the objective's NA was increased to 1.2, wherein Thick filaments were clearly imaged at equivalent quality as with dark field condenser but Actin filaments appeared much brighter as the result of high objective's NA. Typical images under this scenario being depicted in FIGS. 6C through 6E and FIGS. 7B through 7C respectively. Relative brightness, contrast and SNR values for simultaneously imaged Actin and Thick filaments with dark field condenser and the new illumination technique were calculated and summarized in the third to sixth lines of Table 1. From these a significant improvement of 4.57 times in relative brightness and 4.18 times in SNR of Actin filaments using the new illumination technique was observed. Some improvement of 1.68 times in contrast has also been obtained. Thick filament relative brightness, contrast and SNR values were similar irrespective of whether the dark field condenser or the new illumination technique according to an embodiment of the invention was used to visualize them in this simultaneous imaging test.

Interaction and Sliding of Muscle Filaments Imaged with New Illumination Technique:

Images shown and discussed in this section have been processed with ImageJ software by the application of a filter, e.g. mean filter of radius 1 pixel, to smooth out noise. Image brightness and contrast were improved with standard ImageJ tools as well. These simple image adjustments are normal to improve image quality in low light single Actin filament fluorescence (single molecule fluorescence applications) like ours where SNR is low and typically around 5. Motility experiments according to the procedure described above were undertaken. In this set of experiments a freely suspended Actin filament spontaneously attaches to a fixed Thick filament and moves along the Thick filament. Both Actin and Thick filaments were detected during an experiment and the motion of Actin filaments along Thick filaments was clearly visualized. Referring to FIGS. 8A through 8L processed gray scale images of a sliding experiment are depicted wherein the scale bar is 1000 nm (1 μm).

Figure 8A:
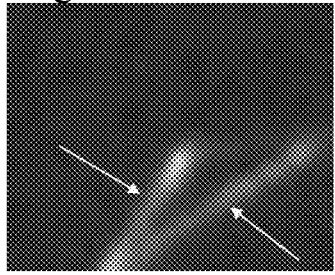
FIGS. 8A through 8L depict in a sequence of video frames the active interaction between a single Actin and Thick muscle filament using an optical illumination assembly according to an embodiment of the invention.

FIG. 8A: Two Thick filaments are present in the image and indicated with white arrows.

Figure 8B:
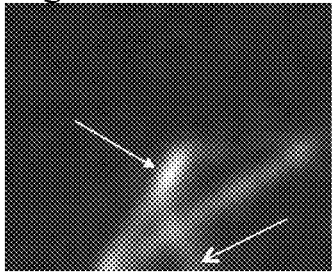
Figure 8C:
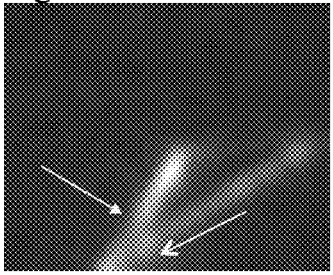

FIG. 8B: A freely suspended Actin filament came from above the cover slip and attached with one end to the Thick filament, the point of attachment is indicated with a regular arrow. The other end of the Actin filament indicated with an open arrow is not yet attached to the Thick filament FIG. 8C: The Actin filament continues to attach to the Thick filament. The next point of attachment is indicated with the regular arrow while free end of Actin filament is indicated with open arrow.

Figure 8D:
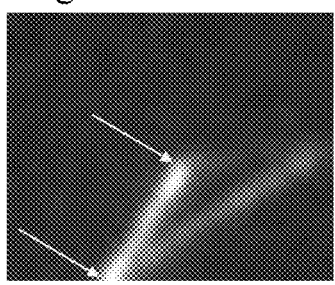
Figure 8E:
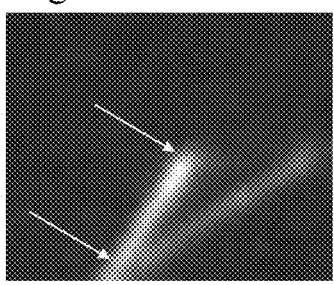
Figure 8F:
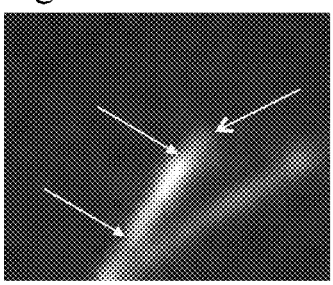
Figure 8G:
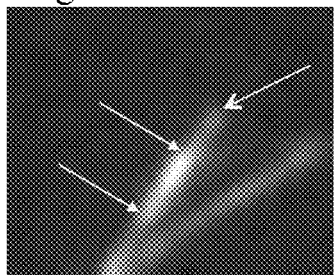
Figure 8H:
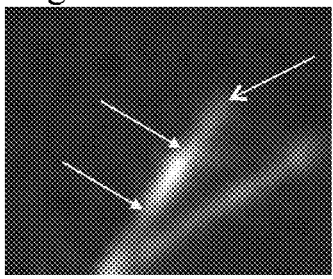
Figure 8I:
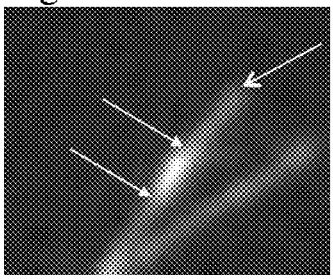
Figure 8J:
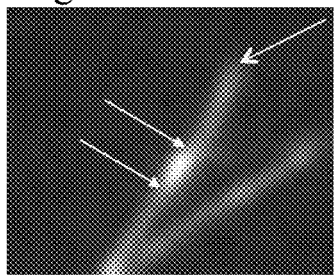
Figure 8K:
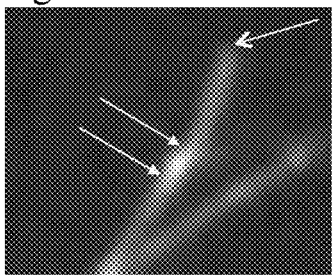
Figure 8L:
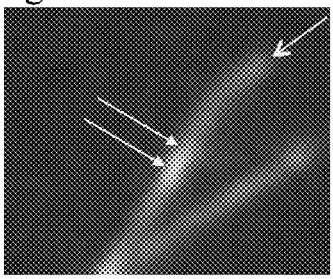
Figure 9A:
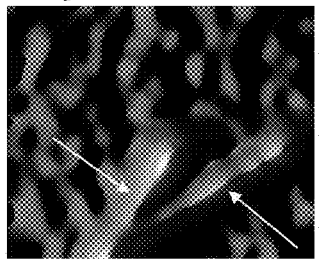
FIGS. 9A through 9L depict color representations of the same video frames shown in FIGS. 8A through 8L depicting the active interaction between a single Actin and Thick muscle filament using an optical illumination assembly according to an embodiment of the invention.
Figure 9B:
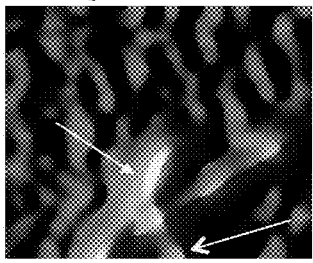
Figure 9C:
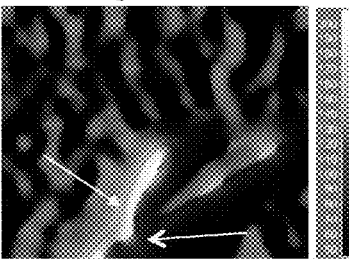
Figure 9D:
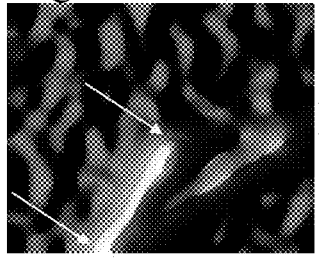
Figure 9E:
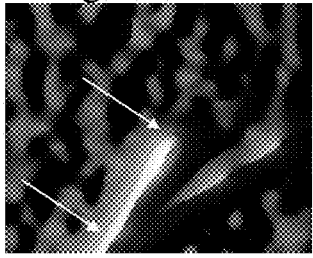
Figure 9F:
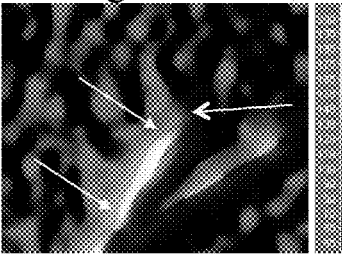
Figure 9G:
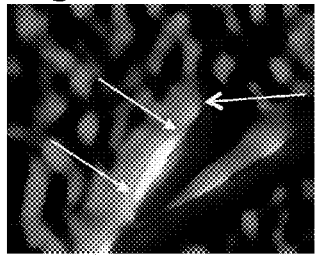
Figure 9H:
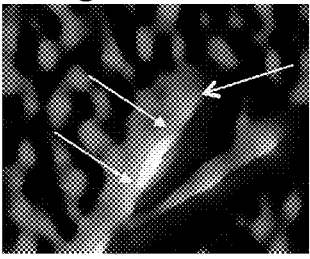
Figure 9I:
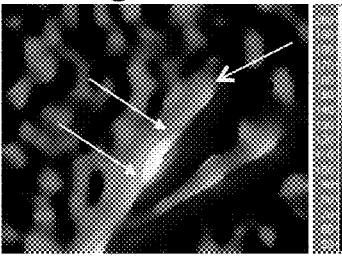
Figure 9J:
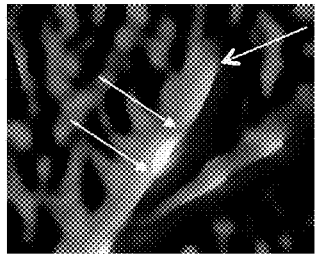
Figure 9K:
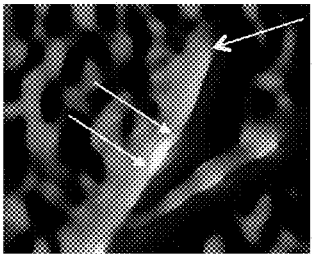
Figure 9L:
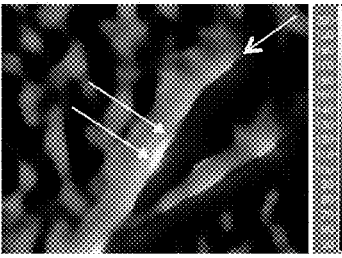
Figure 9L:

FIG. 8D: The whole Actin filament is now attached to the Thick filament.

FIGS. 8E through 8L: The Actin filament slides along the Thick filament. The sliding takes place from the Thick filament center and off the Thick filament. The overlap between the filaments is indicated with two regular arrows while free end of Actin filament is indicated with open arrow.

Referring to FIGS. 9A through 9L respectively false color representations of the intensity profile of the images presented in respect of FIGS. 8A through 8L respectively. Conversion of the 2-D XY grayscale images into 3-D color images was performed using ImageJ software, through the Interactive 3D Surface Plot function. Accordingly the Z axis in these images represents the intensity profile of the image where different colors indicate different levels of intensity. The color legends in the FIGS. 9A through 9L respectively show which color corresponds to which level of gray scale intensity. In many instances this color representation of gray scale video data is more informative and makes the filament appearance more evident as well as filament overlap more distinguishable.

It can be seen from the images presented above in respect of FIGS. 8A through 8L and FIGS. 9A through 9L respectively that the intensity profile of a Thick filament is not always uniform. Frequently, a Thick filament will appear brighter in the center and darker at the ends. Under these circumstances as an Actin filament slides along the Thick filament it may be difficult to detect precisely where the Actin filament begins and where it ends and so it is difficult to detect the filament overlap precisely. Accordingly in order to improve the ability to distinguish both Actin and Thick filaments together with their overlap during interaction the inventors also generated a new image processing sequence, similar to background subtraction, to make the Thick filament intensity uniform all along its length. For this purpose a single image of Thick filament, such as depicted in FIG. 14A, was taken, duplicated and an offset of its brightness by −100 gray scale units undertaken using ImageJ software. The result of this operation being shown in FIG. 14B. Next, using image calculator command of ImageJ the offset image FIG. 14B was subtracted from every frame of the same video sequence where the Thick filament and an Actin filament were interacting. As shown in FIG. 14C this procedure lead to very uniform intensity profile of the Thick filament and as the result during interaction filament overlap intensity signal appears perfectly rectangular with sharp edges.

FIGS. 10A through 10L depict the same video frame sequence as FIGS. 8A through 8L after background image according to the process described in respect of FIG. 14A through 14C in order to make the Thick filament intensity profile uniform. As such it is evident where both filaments begin and where they end such that during interaction it allows more precise determination of the filament overlap. FIGS. 11A through 11L depict the color representation of the same video frames shown in FIGS. 10A through 10L respectively. Both Actin and Thick filaments are clearly seen and filament overlap can be measured precisely.

Figure 10A:
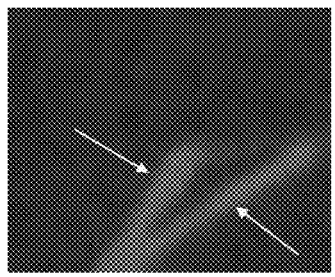
FIGS. 10A through 10L depicts the same video frame sequence as FIGS. 8A through 8L after background image subtraction to increased uniformity of the Thick filament intensity profile.
Figure 10B:
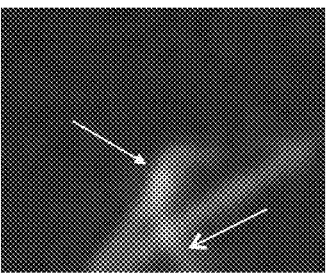
Figure 10C:
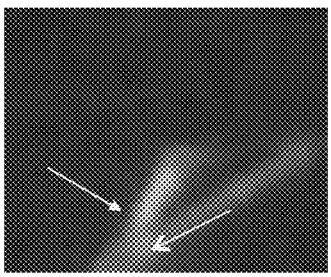
Figure 10D:
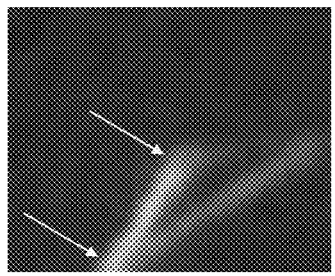
Figure 10E:
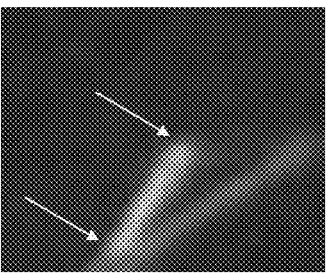
Figure 10F:
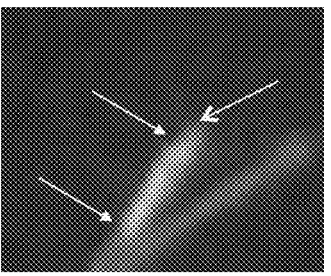
Figure 10G:
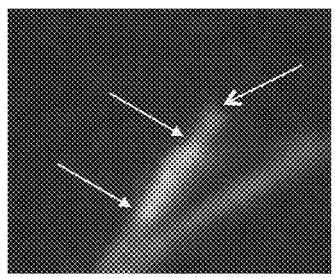
Figure 10H:
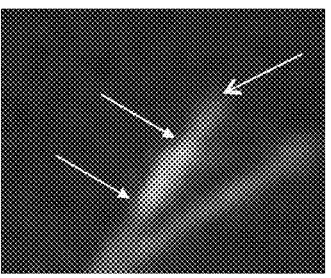
Figure 10I:
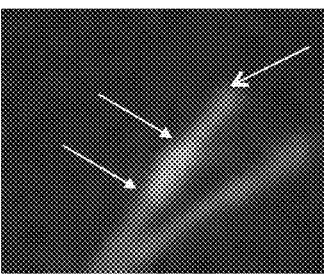
Figure 10J:
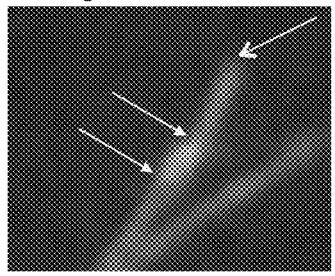
Figure 10K:
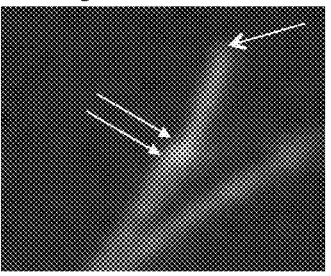
Figure 10L:
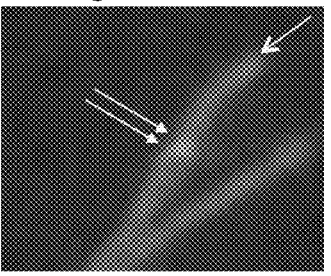
Figure 11A:
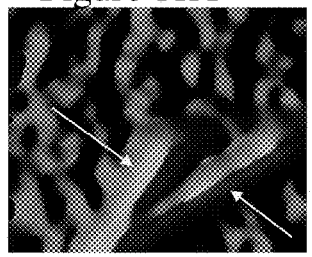
FIGS. 11A through 11L depicts color representations of the background corrected images presented in FIGS. 10A through 10L respectively.
Figure 11B:
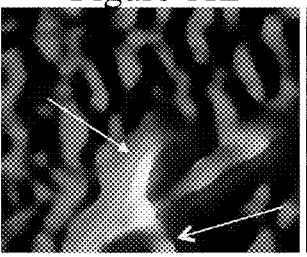
Figure 11C:
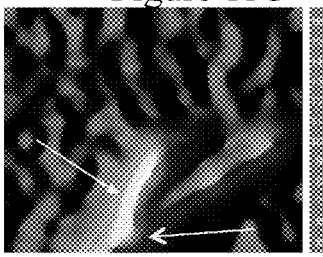
Figure 11D:
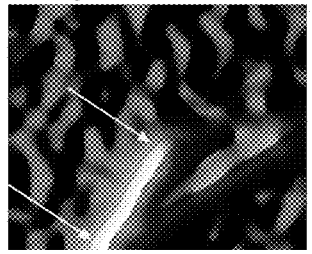
Figure 11E:
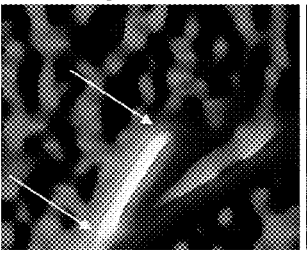
Figure 11F:
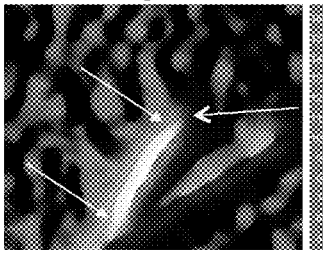
Figure 11G:
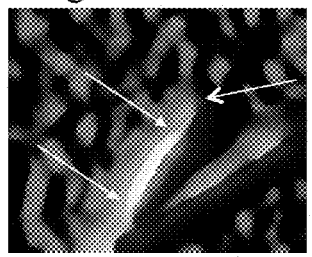
Figure 11H:
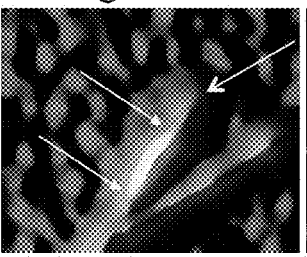
Figure 11I:
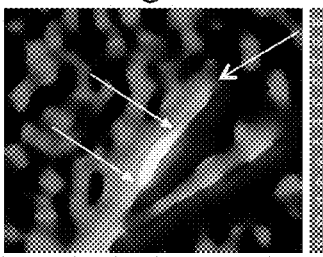
Figure 11J:
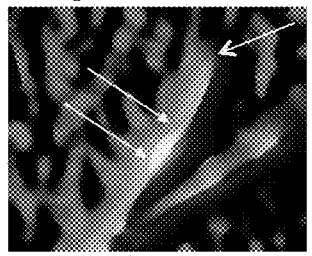
Figure 11K:
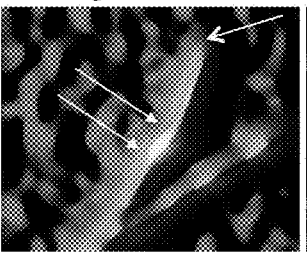
Figure 11L:
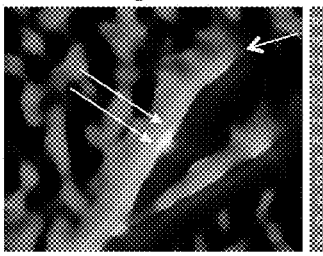
Figure 12A:
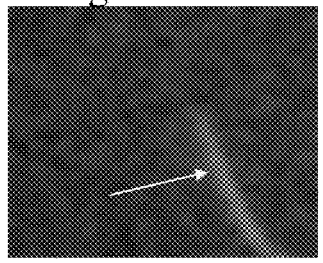
FIGS. 12A through 12F depict optical micrographs of another experiment where single Actin and Thick filament interact as visualized using an optical illumination assembly according to an embodiment of the invention.
Figure 12B:
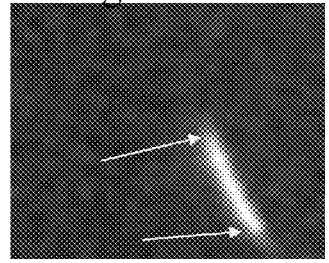
Figure 12C:
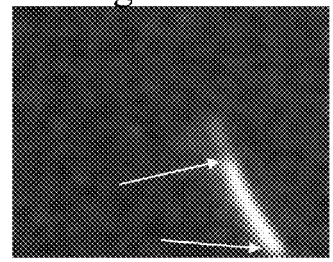
Figure 12D:
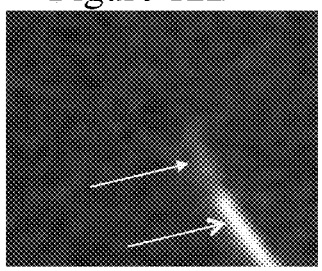
Figure 12E:
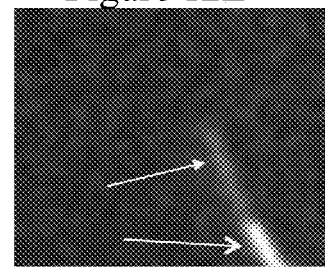
Figure 12F:
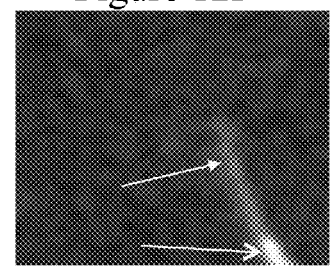
Figure 12G:
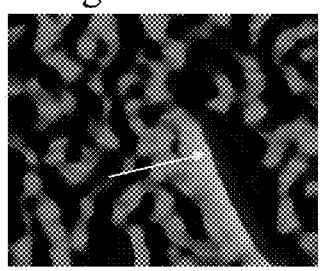
FIGS. 12G through 12L represent color representations of the images presented in FIGS. 12A through 12F respectively.
Figure 12H:
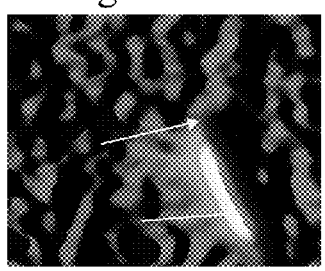
Figure 12I:
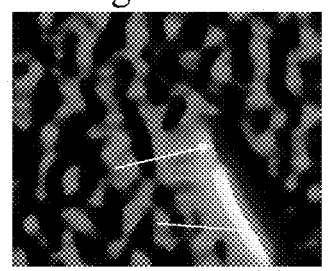
Figure 12J:
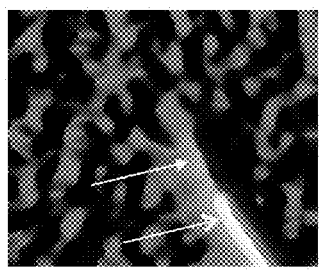
Figure 12K:
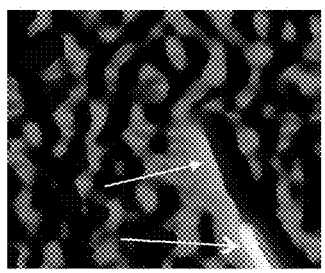
Figure 12L:
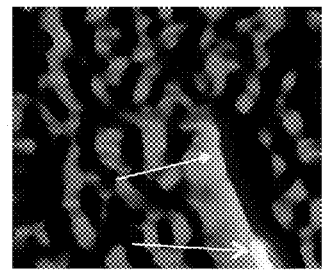
Figure 13A:
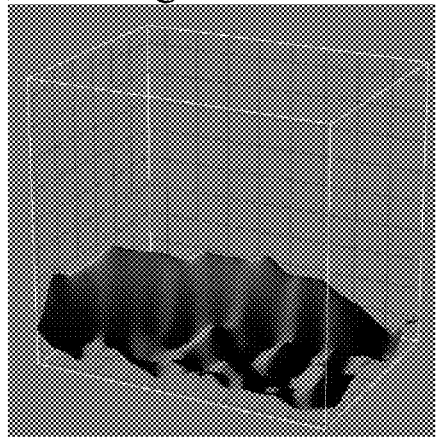
FIGS. 13A through 13F depict color representation of the gray scale video frames depicted in FIGS. 12A through 12F respectively.
Figure 13B:
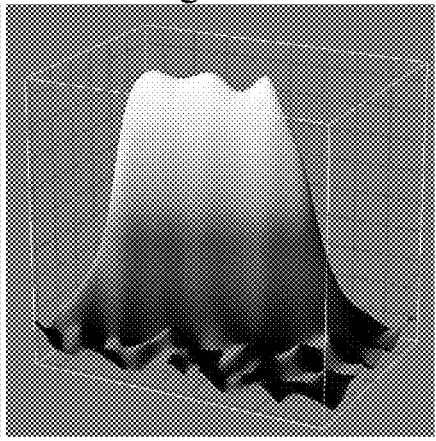
Figure 13B:
Figure 13C:
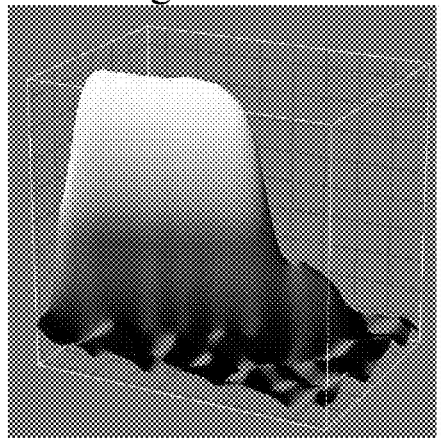
Figure 13D:
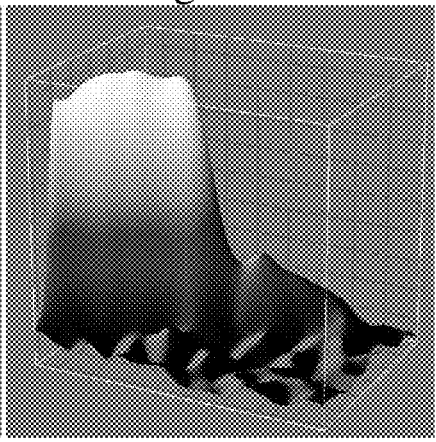
Figure 13D:
Figure 13E:
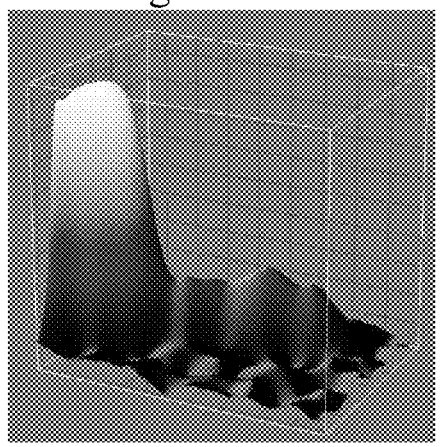
Figure 13F:
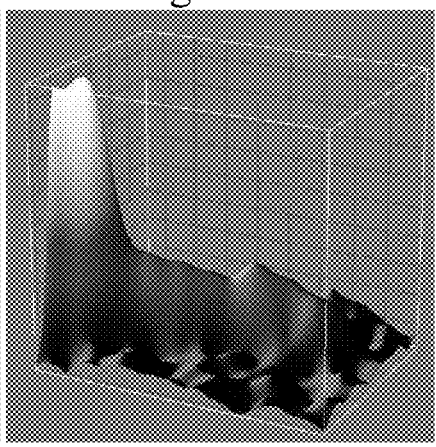
Figure 13F:

Based upon these experimental procedures employing the illumination system according to an embodiment of the invention when the Actin filament fully attached to the Thick filament, see FIG. 10D, the overlap was measured as 3098 nm. This overlap reduces as the Actin filament slides off the Thick filament, as depicted sequentially in FIGS. 10E through 10L respectively wherein at the end of the experiment the filament overlap was 421 nm, see FIG. 10L.

FIGS. 12A through 12F depict optical micrographs of another experiment where single Actin and Thick filaments interact as visualized using an optical illumination assembly according to an embodiment of the invention. FIGS. 12G through 12L represent color representations of the images presented in FIGS. 12A through 12F respectively. Within the experiment shown in the images of FIGS. 12A through 12F, and accordingly also FIGS. 12G through 12L, the filament overlap was 3360 nm. This experiment is also depicted in FIGS. 13A through 13F respectively wherein color representation side view intensity profiles are depicted. In many instances measuring the filament overlap using side view images can be more convenient than in the top view images because intensity levels of filaments and filament overlap are indicated more clearly.

Within the descriptions of embodiments of the invention of the illumination system in respect of FIGS. 1A through 3 and the resulting experimental results using the illumination system according to embodiments of the invention a new technique allowing simultaneous bright, high contrast high SNR visualization of biological samples, in this case two key contractile muscle filaments, namely Actin and Thick filaments. Brightness and SNR of Actin filaments were significantly improved by 4.57 and 4.18 times respectively compared to previous known techniques in the prior art. Additionally, contrast of Actin filaments has also been improved by 1.68 times although Actin filament contrast values can vary depending on how bright the Thick filament illumination is. This arises as brighter Thick filament illumination causes higher background level of the image which lowers Actin filament (as well as Thick filament) contrast.

Theoretically the brightness of Actin filaments is proportional to the objective's NA to the fourth power. Based on this how the brightness of Actin filaments should increase when the NA changes from 0.8, for the experiments using prior art dark field condenser, to 1.2 for the experiments using the fiber illumination technique according to an embodiment of the invention. Equation (12) provides the theoretical ratio of brightness with varying NA.

$$\frac{(\text{Brightness} - OpticalFiber)^4}{(\text{Brightest} - DarkField)^4} = \frac{(1.2)^4}{(0.8)^4} = 5.06 \quad (12)$$

Accordingly, the Actin filament brightness increases in an illumination system according to an embodiment of the invention by 5.06 times for these numerical apertures which is close to the experimentally obtained value of 4.57. In addition to the image parameters being significantly improved the technique according to an embodiment of the invention allowed for precise measurements of Thick and Actin filament overlap, one of the key parameters in the field of muscle biophysics. Within different experiments overlap values ranged from about 400 nm to about 4000 nm. Beneficially, the optical illumination system according to embodiments of the invention allows this simultaneous imaging technique to be applied to a wide range of biological systems. Any fluorescent and non-fluorescent objects can be imaged simultaneously. Typically, the non-fluorescent object would have a lower dimensional limit of approximately 50 nm in diameter to provide sufficient image brightness although it would be evident to one skilled in the art that adjustments in the optical illumination design may adjust this.

Beneficially, unlike the prior art dark field condenser situation the illumination technique according to embodiments of the invention does not have illumination system elements on the top of the experimental chamber which could block access to the sample being observed, characterized and evaluated. This is a very important improvement for applications wherein active manipulation of the sample is part of the experimental procedure. Within the descriptions the OPAXB was designed and engineered so that it can be used together with the ILUC not only as a dark field illumination device but also as the highest resolution bright field illumination device. This becomes possible because the system allows the angle of illumination to be matched with the maximum angle of acceptance of the objective. This is usually impossible using standard bright field condensers in biological applications as a bright field condenser is immersed in a water solution which has lower refractive index, n=1.33, than objective oil, typically n=1.515, and therefore the highest maximum possible resolution cannot be achieved.

Dark field imaging requires significant illumination to image small objects as only scattered light is used to build an image. This is the cost for the high contrast allowed by dark field imaging techniques compared to other imaging techniques such as bright field. In many biological systems, such as the muscle filaments employed supra which are typically 50-90 nm in diameter these should scatter light according to Rayleigh scattering. In this scenario the intensity and therefore the brightness of the object is proportional to $D^6$, where D is a characteristic size of the object, e.g. the Thick filament diameter. Accordingly, the brightness of the filaments is very sensitive to its diameter.

Accordingly to the embodiments of the invention described supra 3 or 4 light sources, depending on the experiment, were connected to the ILUC via optical fibers. Actually, imaging of Thick filaments using only one optical fiber bringing light from only one short arc or halogen light source was demonstrated and multiple fibers were employed to provide symmetrical illumination. Accordingly, an alternative illumination system may provide multiple fibers and multiple sources to provide uniform excitation over wider optical illumination power range. Illuminating the samples from multiple angles increases the probability that the light will scatter from the sample at the right angle so that it will enter in the objective. This is because scattering angles will be different depending on the orientation of the sample in space which is random for every filament in every experiment. Accordingly, visualization of small objects would be improved through providing an infinite number of infinitely small light sources illuminating the sample from all possible aspects (angles) such that the probability that the light scattered from a randomly orientated filament will enter in the objective is maximized.

Figure 15:
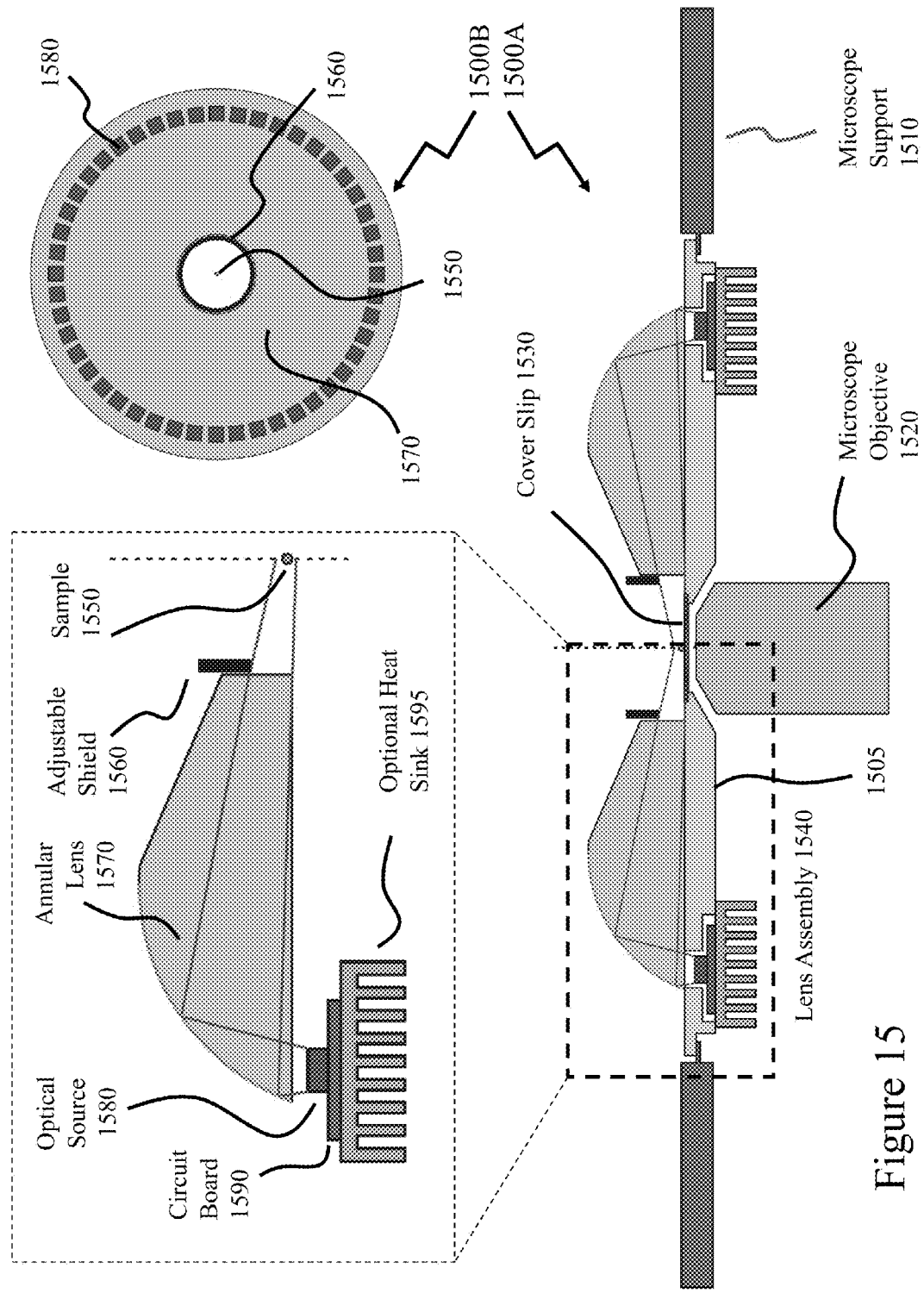
FIG. 15 depicts an optical illumination assembly according to an embodiment of the invention exploiting multiple excitation elements within a concept coined as a "molecular stadium"

Accordingly referring to FIG. 15 there is depicted another embodiment of the illumination concept and image visualization described above in respect of FIGS. 1A through 2H. As depicted in cross-section 1500A a microscope support 1510 has a circular Lens Assembly 1540 which includes a circular frame 1505 supporting a Cover Slip 1530 at its centre and provides access for a Microscope Objective 1520 on the lower side. As depicted in the expanded cross-section, wherein the circular frame has been omitted for clarity, a Circuit Board 1590 has mounted atop an Optical Sources 1580 which is coupled to an Annular Lens 1570 that couples the light emitted from the Optical Sources 1580 to the Sample 1550. The Lens 1570 having an Adjustable Shield 1560 disposed on the inside of the annular disc. The Adjustable Shield 1560 allows the range of incident angles of the Optical Sources 1580 to be adjusted allowing the NA of the imaging objective can be similarly varied such that the incident light is not directly coupled into the imaging objective. Accordingly, as the NA is increased the Adjustable Shield 1560 is lowered towards the sample.

As evident from plan 1500B the Annular Lens 1570 is circularly symmetric and sits atop a plurality of Optical Sources 1580 which are provided in a circular configuration such that they are all coupled to the Sample 1550 via the circular Adjustable Shield 1560. In this manner a large number of Optical Sources 1580 can be provided, such as discussed supra in respect of increasing the probability of scattering from the sample into the Microscope Objective 1520. An optional heatsink 1590 may be provided beneath the Optical Source 1580 and Circuit Board 1590. It would be evident to one skilled in the art that Optical Sources 1580 may for example be Light Emitting Diodes of one or more type. For example, these may be discrete infrared, red, yellow, green, blue, or ultraviolet LEDs or a combination of these. Optionally, these may be white LEDs exploiting RGB tri-chromatic assemblies, tetrachromatic assemblies, or phosphors for example. Alternatively, organic LEDs, active-matrix organic light-emitting diodes (AMOLEDs), incandescent sources, halogen sources, etc may be employed discretely or in combination with other sources.

It would also be evident that by appropriate design of the Annular Lens 1570 and placement of Optical Sources 1580 that multiple annular rings of emitters may be employed including for example ultraviolet emitters for stimulating fluorescent biological markers, white LEDs and narrowband emitters of specific wavelength ranges. It would be evident that other designs may exploit annular lens sections rather than providing a complete annular ring.

Figure 16:
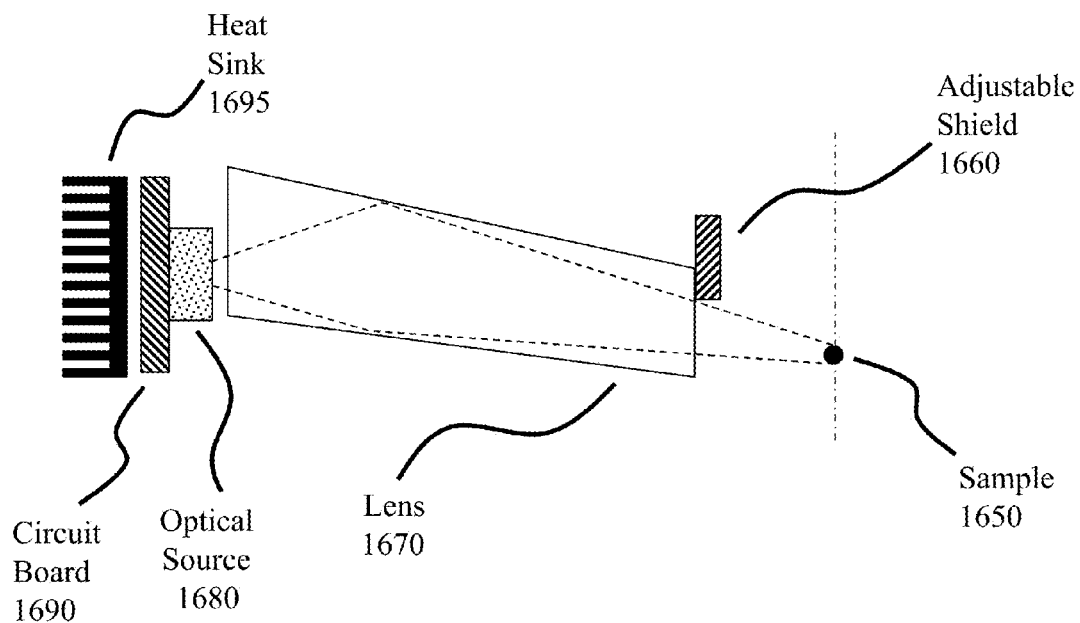
FIG. 16 depicts a "molecular stadium" according to an embodiment of the invention.
Figure 16:
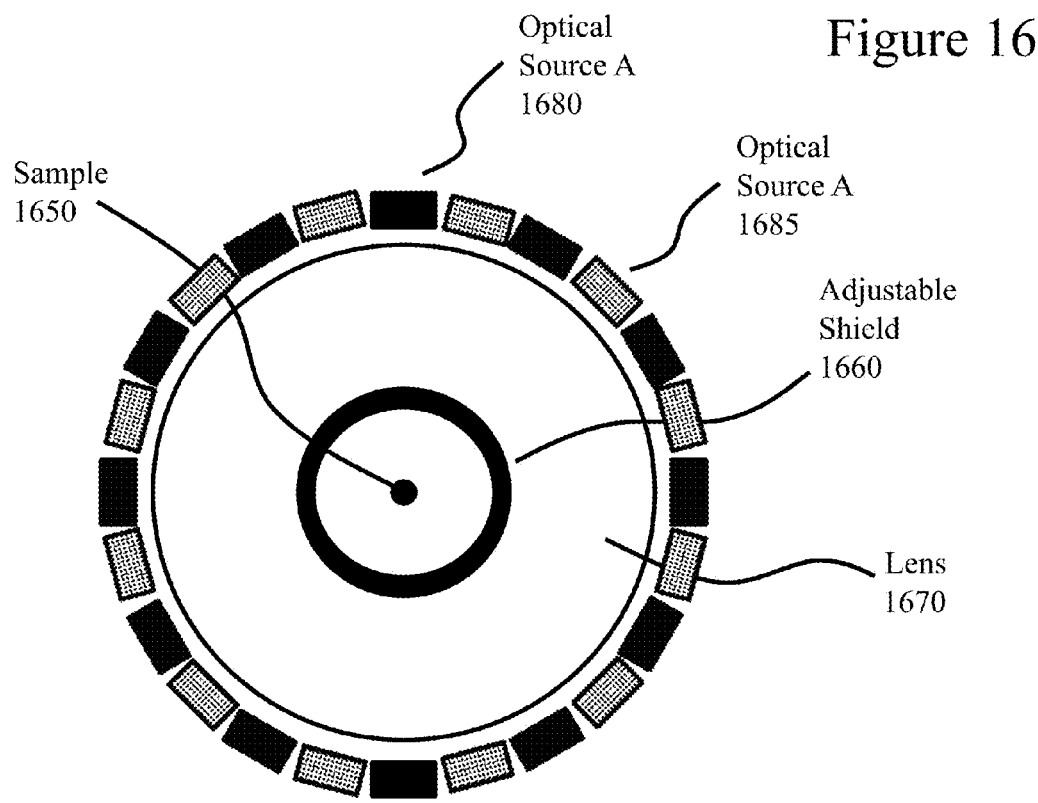

Referring to FIG. 16 another embodiment of the invention with respect to a "molecular stadium" is presented. As depicted a Lens 1670 forms an annular configuration around a space within which the Sample 1650 is disposed. Disposed on the inner ring of the Lens 1670 is an Adjustable Shield 1660, similar to Adjustable Shield 1560 in FIG. 15. Disposed around the Lens 1670 are a plurality of Optical Sources A and B 1680 and 1685 respectively that are mounted to Circuit Board 1690 and heat Sink 1695. Lens 1670 is designed to couple light from each Optical Sources A and B 1680 and 1685 respectively to the Sample 1650 and is designed in dependence of characteristics of the optical imaging system including but not limited to NA of image acquisition system and optical characteristics of Optical Sources A and B 1680 and 1685 respectively such as beam divergence. Within the embodiments of the invention described in respect of FIGS. 15 and 16 the Adjustable Lens 1560 or 1660 respectively is described in a configuration wherein motion in a direction parallel to an optical axis of the optical imaging system has been described. However, it would be evident to one skilled in the art that alternatively the motion may be in a direction at an angle to the optical axis of the optical imaging system, e.g. perpendicular, or may rotate relative to this optical axis. Optical Sources A and B 1680 and 1685 respectively may for example be ultraviolet LEDs and white LEDs respectively allowing fluorescent excitation as well as optical imaging. As discussed supra Optical Sources A and B 1680 and 1685 respectively may be selected from a wide range of optical sources according to the experiments being performed.

Within the embodiments of the invention described above in respect of FIGS. 2A through 16 the imaging has been described in terms of a microscope object that forms part of the imaging system providing simultaneous fluorescent imaging and dark field imaging. However, it would be apparent that other optical imaging designs may be employed according to embodiments of the invention without departing from the scope of the invention and that the design of such optical imaging designs in combination with design variations to the illumination systems and experimental chambers may allow combinations of other imaging techniques to be used simultaneously rather than sequentially upon a single specimen or upon multiple specimens.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a plurality of optical emitters disposed at approximately constant radius from a location to be imaged;
an annular lens receiving the optical output from each optical emitter of the plurality of optical emitters and coupling these optical outputs to the location to be imaged;
an adjustable shield disposed on the inner edge of the annular lens, the adjustable shield varying an angular range of optical signals from the plurality of optical emitters coupled to the location to be imaged.

2. The system according to claim 1 wherein;
the angular range of optical signals from the plurality of optical emitters coupled to the location to be imaged lies outside an acceptance angular range of an imaging system comprising at least a lens for imaging the location to be imaged.

3. The system according to claim 1 wherein,
the position of the adjustable shield can be adjusted thereby allowing the angular range of the optical signals from the plurality of optical emitters to be adjusted in dependence upon a numerical aperture of an imaging system comprising at least a lens for imaging the location to be imaged.

4. The system according to claim 1 wherein,
the imaging system allows for fluorescent imaging and dark field imaging to be performed simultaneously.

5. The system according to claim 1 wherein,
the plurality of optical emitters, the adjustable shield and an imaging system comprising at least a lens for imaging the location to be imaged provide for concurrent and independent optimization of fluorescent imaging and dark field imaging of a sample disposed at the location to be imaged.

6. The system according to claim 1, wherein:
the annular lens comprises a central opening within which the location to be imaged is located;
the optical signals from the plurality of optical emitters coupled to the location to be imaged are imaged by the annular lens through a lens surface forming the central opening; and
the adjustable shield is disposed between the annular lens and the location to be imaged.

7. The system according to claim 1, wherein:
a first subset of the plurality of optical emitters emit within a first predetermined wavelength range; and
a second subset of the plurality of optical emitters emit within a second predetermined wavelength range.

8. The system according to claim 1, wherein a first subset of the plurality of optical emitters emit are ultraviolet optical emitters and a second subset of the plurality of optical emitters are visible optical emitters.

9. The system according to claim 1, wherein the plurality of optical emitters are disposed with their emitting direction either parallel to or perpendicular to an optical axis of a lens forming part of an imaging system for imaging the location to be imaged.

* * * * *